United States Patent [19]
Ohsawa et al.

[11] Patent Number: 5,291,236
[45] Date of Patent: Mar. 1, 1994

[54] CAMERA

[75] Inventors: Toshifumi Ohsawa, Tokyo; Ryuichi Kobayashi, Kanagawa; Masayoshi Kiuchi, Kanagawa; Tatsuo Konno, Kanagawa; Toshio Matsumoto, Kanagawa; Jun Terashima, Kanagawa, all of Japan

[73] Assignee: Canon Kabushiki Kaisha, Tokyo, Japan

[21] Appl. No.: 925,892

[22] Filed: Aug. 7, 1992

Related U.S. Application Data

[63] Continuation of Ser. No. 759,629, Sep. 16, 1991, abandoned, which is a continuation of Ser. No. 475,862, Feb. 6, 1990, abandoned.

[30] Foreign Application Priority Data

Feb. 10, 1989 [JP] Japan .................. 1-031410
Feb. 10, 1989 [JP] Japan .................. 1-031414
Feb. 10, 1989 [JP] Japan .................. 1-031417
Feb. 10, 1989 [JP] Japan .................. 1-032361

[51] Int. Cl.$^5$ ............................................ G03B 7/00
[52] U.S. Cl. ............................... 354/412; 354/289.12
[58] Field of Search .............. 354/412, 281, 289.12, 354/105, 106, 288

[56] References Cited

U.S. PATENT DOCUMENTS

| | | | |
|---|---|---|---|
| 4,687,308 | 8/1987 | Someya | 354/289.1 |
| 4,751,536 | 6/1988 | Konno | 354/212 |
| 4,857,951 | 8/1989 | Nakajima et al. | 354/400 |
| 4,933,697 | 6/1990 | Kawamura et al. | 354/289.1 |
| 4,974,013 | 11/1990 | Ohsawa | 354/289.12 |

Primary Examiner—David M. Gray
Attorney, Agent, or Firm—Fitzpatrick, Cella, Harper & Scinto

[57] ABSTRACT

A camera includes a signal input circuit mounted in a back cover, a processing circuit receptive of signals from the signal input circuit for processing camera information, a control circuit operating with selection of exposure modes, and a circuit for changing over kinds of camera information to be input by the signal input circuit in accordance with the selected one of the modes.

43 Claims, 24 Drawing Sheets

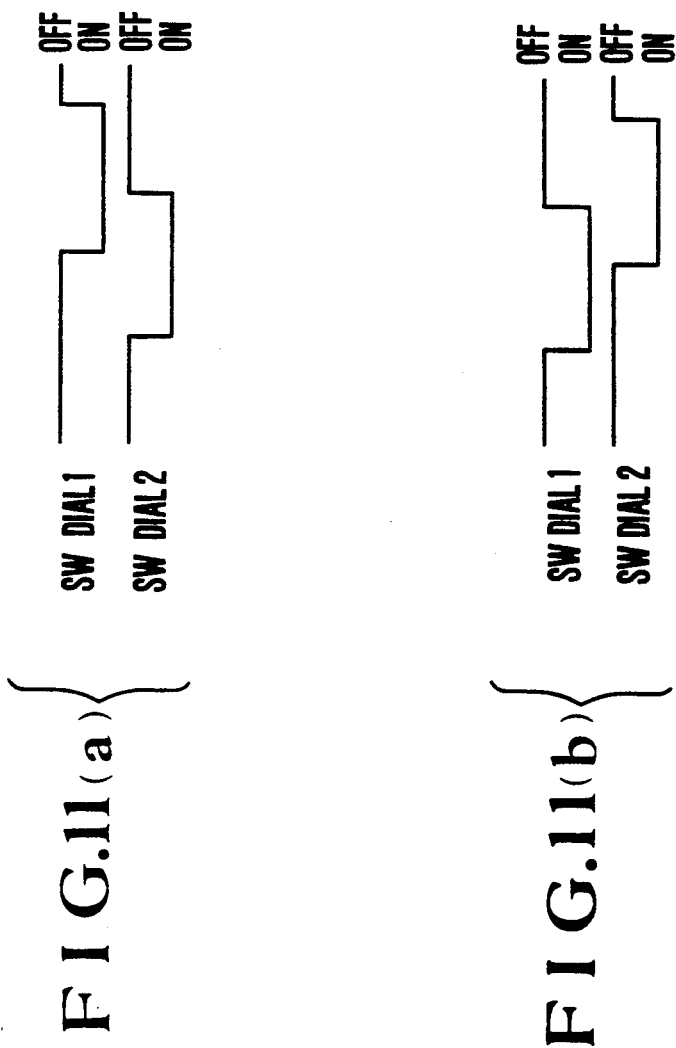

FIG.16

| DATA | ADDRESS | | | |
|---|---|---|---|---|
| | 00 | 01 | 10 | 11 |
| -3 | | | -3 | |
| -2 | F-2 | 1 | -2 | |
| -1 | F-1 | 0 | -1 | |
| 0 | | | | |
| 1 | 2 | 1.4 | +1 | M |
| 2 | 4 | 2.0 | +2 | T |
| 3 | 8 | 2.8 | +3 | A |
| 4 | 15 | 4.0 | | |
| 5 | 30 | 5.6 | | |
| 6 | 60 | 8.0 | | |
| 7 | 125 | 11 | | |
| 8 | 250 | 16 | | |
| 9 | 500 | | | |
| 10 | 1000 | | | |

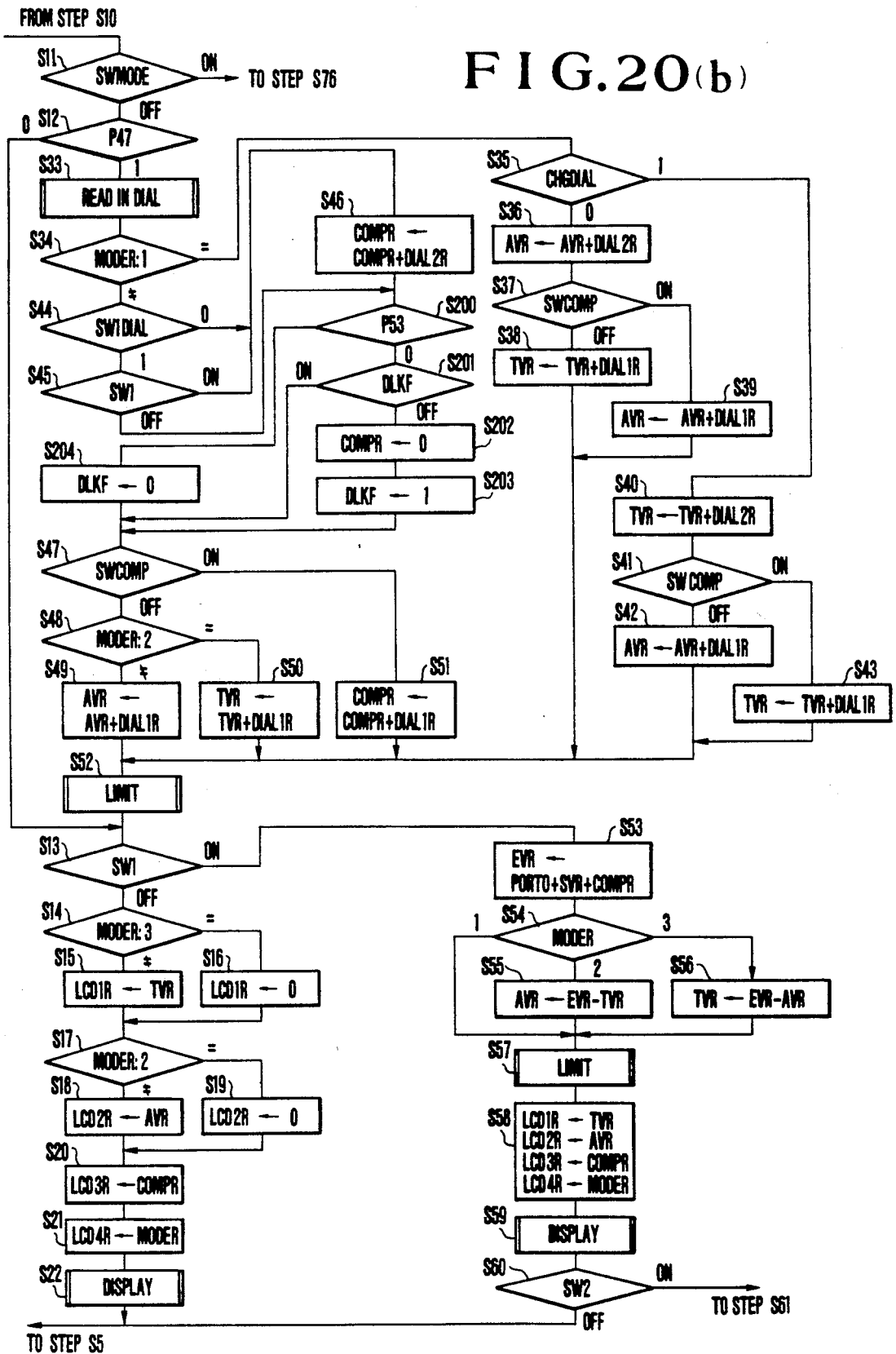

CAMERA

This application is a continuation of application Ser. No. 07/759,629 filed Sep. 16, 1991, which is a continuation of Ser. No. 07/475,862 filed on Feb. 6, 1990, both now abandoned.

BACKGROUND OF THE INVENTION

1. Field of the Invention

This invention relates to a camera having a capability of inputting information from the back cover.

2. Description of the Related Art

The conventional device for inputting items of information into a camera is provided with a number of actuating members in the form of levers, dials or buttons, either equal to, or less than, the number of the items. In the latter, any two of some of the actuating members are operated at the same time to select a sequence of functions, thus being provided as the multi-function actuating members.

For the camera with such an information input device, most of the actuating members are laid out on the upper and front sides of the camera. In particular, the aforesaid levers and the dials, if any, are made to take their places in the neighborhood of the shutter release button.

The conventional camera of the character described above has the following problems:

Suppose, while aiming the camera at an object, one has yet to input information into the camera by the actuating member on the front or upper side thereof, then the index, middle or third finger of his or her right hand must be used to operate that actuating member. Because this is very difficult to do, one has many occasions for moving the index finger away from touching the shutter button. Therefore, the probability of missing a good shutter chance becomes high.

With the motor drive device (or high-speed winding device) attached to the camera, when taking vertical shots, one has to use another release button which is provided on that motor drive device for the vertical position. In this case, because no equivalent actuating members to the aforesaid ones are provided in the neighborhood of the second release button, they cannot be operated under the condition that the index finger is touching, but not fully pressing, it. Therefore, it is impossible to input information, while simultaneously aiming the camera at the object to be photographed.

SUMMARY OF THE INVENTION

One aspect of this invention is on the premise of application to the camera having digital signal input means on the back cover thereof, and is to provide a camera having a capability of selectively setting items of camera information by the digital signal input means.

One aspect of this invention is to provide a camera in which that item of camera information which can be set by the digital signal input means is made to automatically change over between when electric power is supplied as the release button is half pushed, and when it stands by, thus enabling erroneous setting of information to be prevented.

One aspect of this invention is to provide a camera having a dial for information input positioned on the surface of the back cover thereof at a location near to the thumb of the right hand as one holds the camera for either of horizontal and vertical shots.

One aspect of this invention is to provide the camera having the digital signal input means on the back cover with an actuating member for prohibiting signals from being inputted by the signal input means.

BRIEF DESCRIPTION OF THE DRAWINGS

FIGS. 11(a) and 11(b) are pulse timing charts.
FIG. 16 is a table of the data in correspondence with the items of information on the LCD display.
FIGS. 20(a) and 20(b) are flowcharts.

DETAILED DESCRIPTION OF THE PREFERRED EMBODIMENTS

Figure 1:
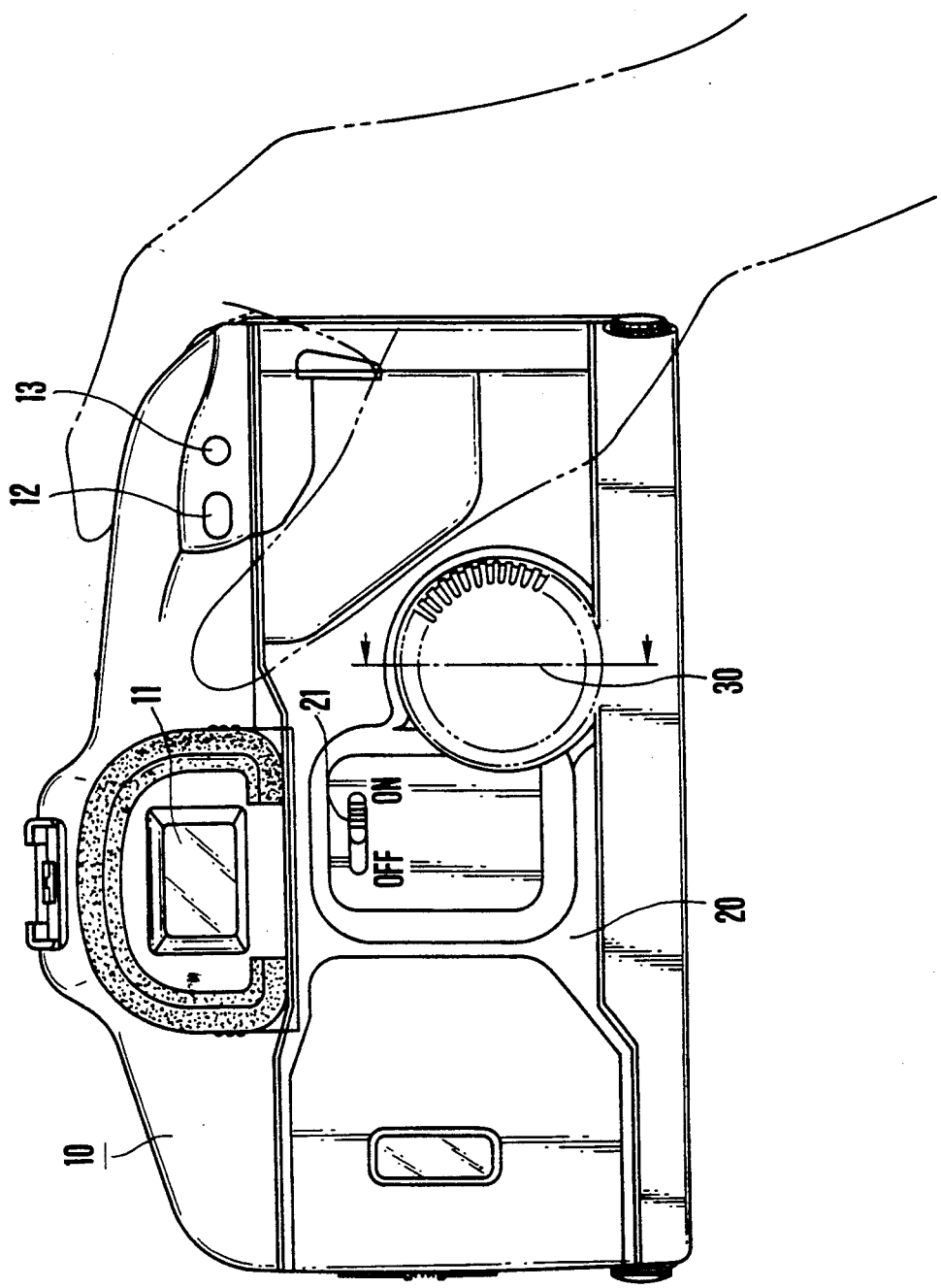
FIG. 1 is a back view of a camera of the invention.
Figure 2:
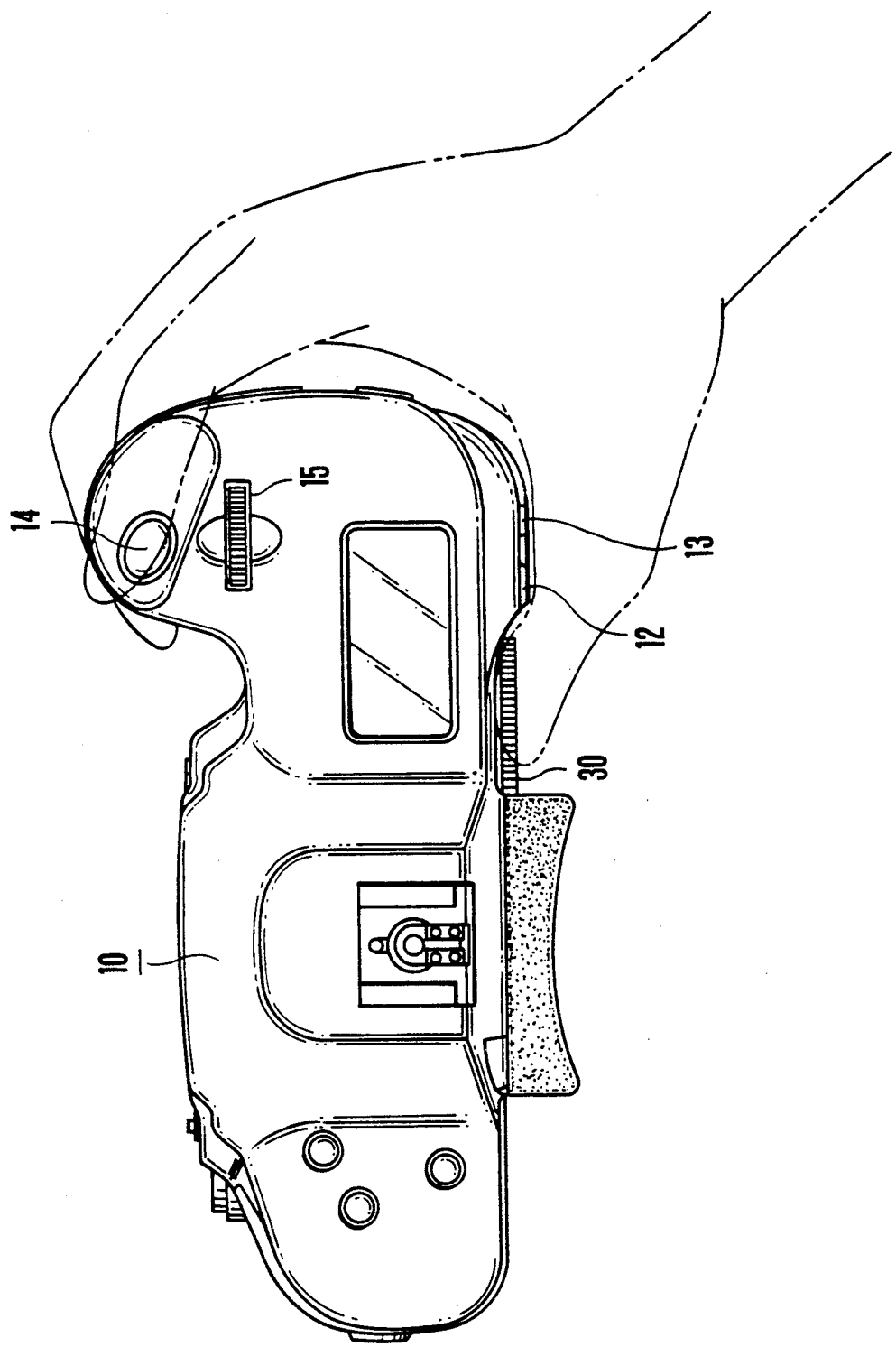
FIG. 2 is a top view of the same camera.
Figure 3:
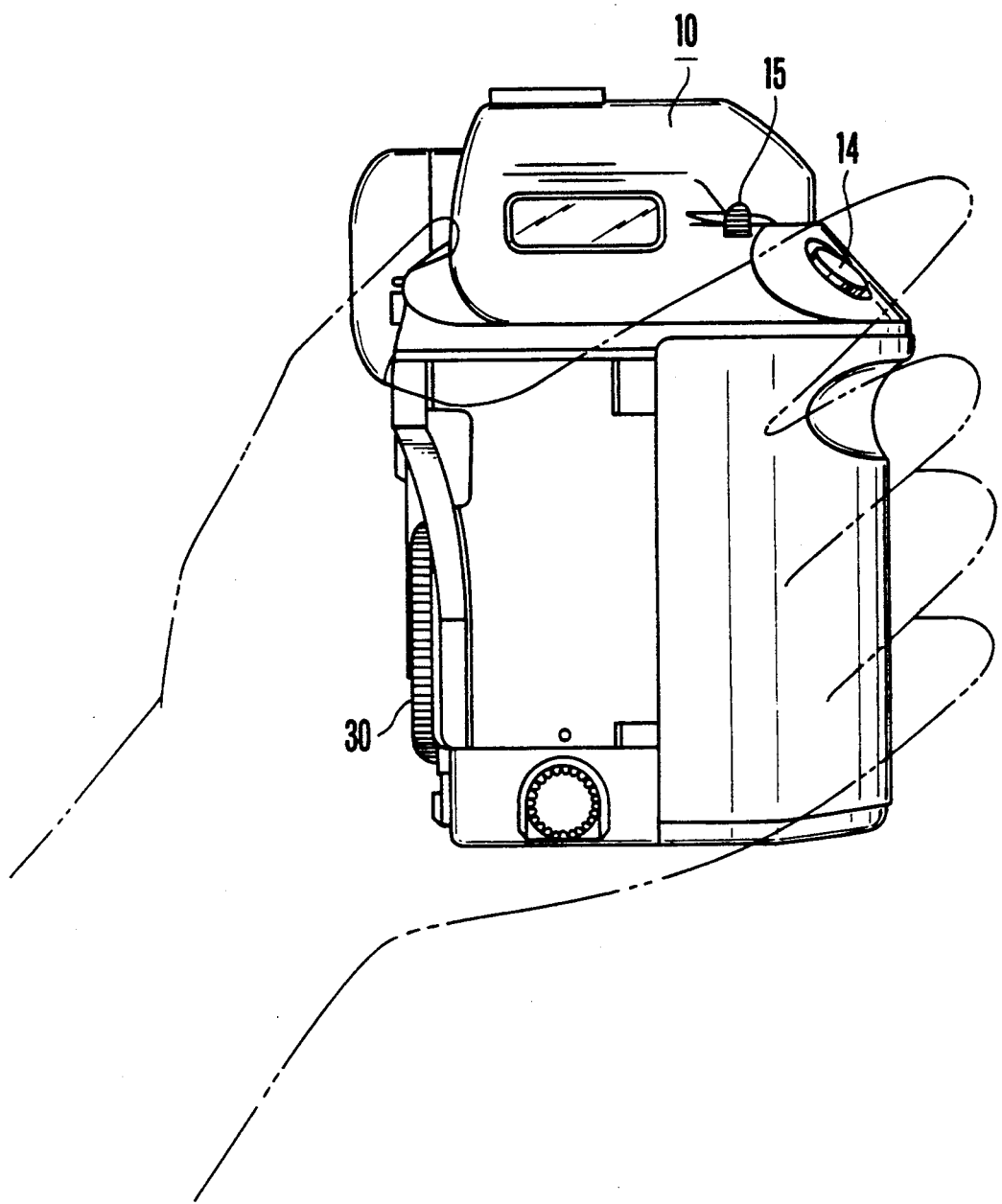
FIG. 3 is a side view of the same camera.

FIG. 1 to FIG. 7 show the structure of an embodiment of the camera according to the invention. In FIG. 1 to FIG. 3, a camera body 10 has a window 11 of a finder. A button 12, when in the automatic exposure mode, functions as an exposure compensation button for performing compensation for the control value, or, when in the manual exposure mode, as an aperture setting button for setting an aperture value of a diaphragm in the lens. With the button 12 pushed down, when a dial 15 on the upper panel of the camera body 1 is rotated, an exposure compensation amount or an aperture value is input and set. An AE lock button 13, when the camera is in the automatic exposure mode, locks its control value temporarily. Reference numeral 14 denotes a release button. A multi-function dial 15 is used to selectively input many items of information. A back cover 20 has a dial 30 for inputting information into the camera and a dial lock switch 21 for prohibiting the dial 30 from inputting information, mounted on its flat surface.

Figure 4:
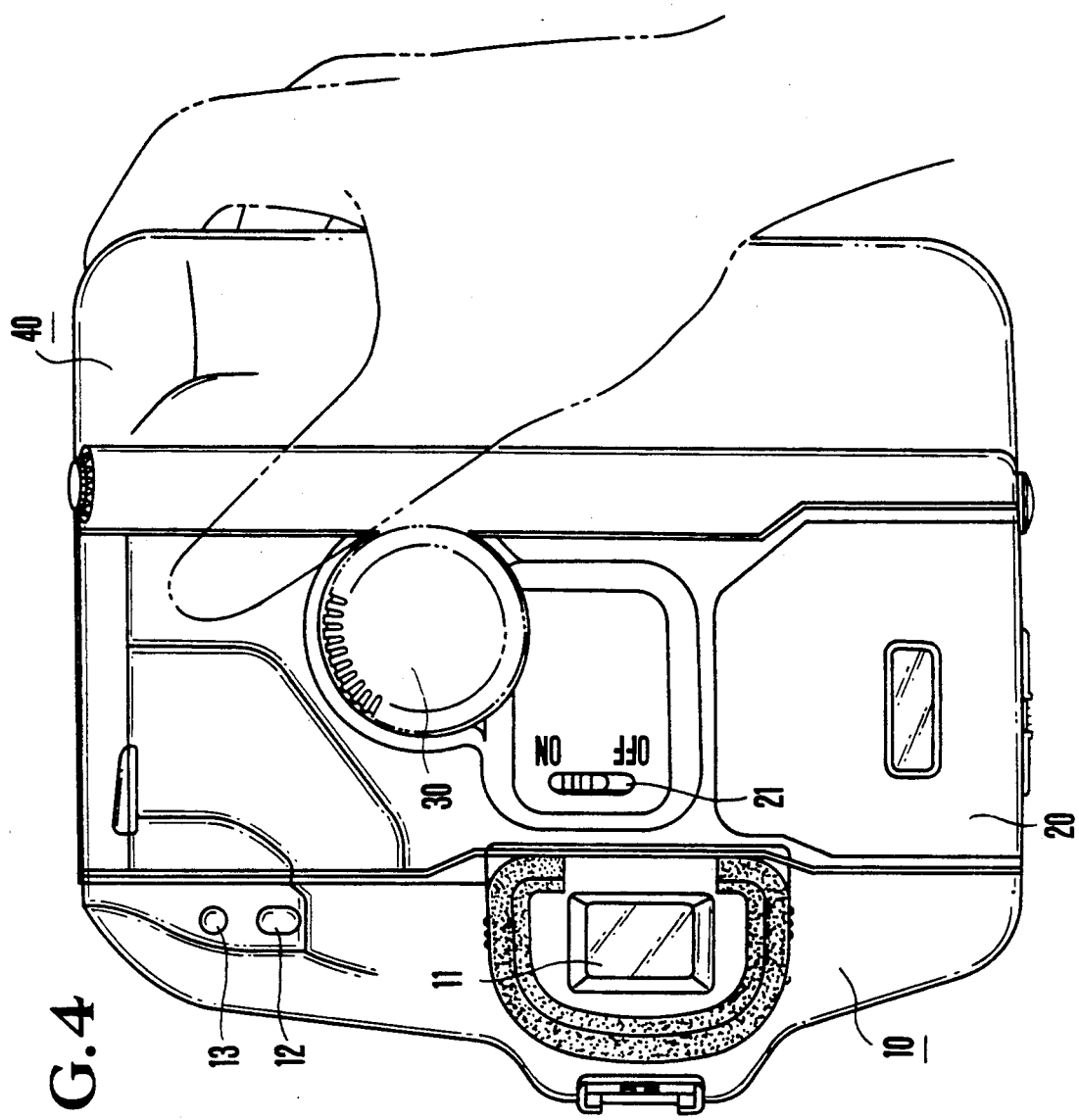
FIG. 4 is a back view of the camera of FIG. 1 with a high-speed winding device attached thereto in the vertical position.

FIG. 4 shows a state in which a high-speed winding device 40 is releasably attached to the bottom of the camera body 10 and the camera with the winding device 40 is being held in the vertical position. This high-speed winding device 40 has a release button (not shown) for vertical shots.

Figure 5:
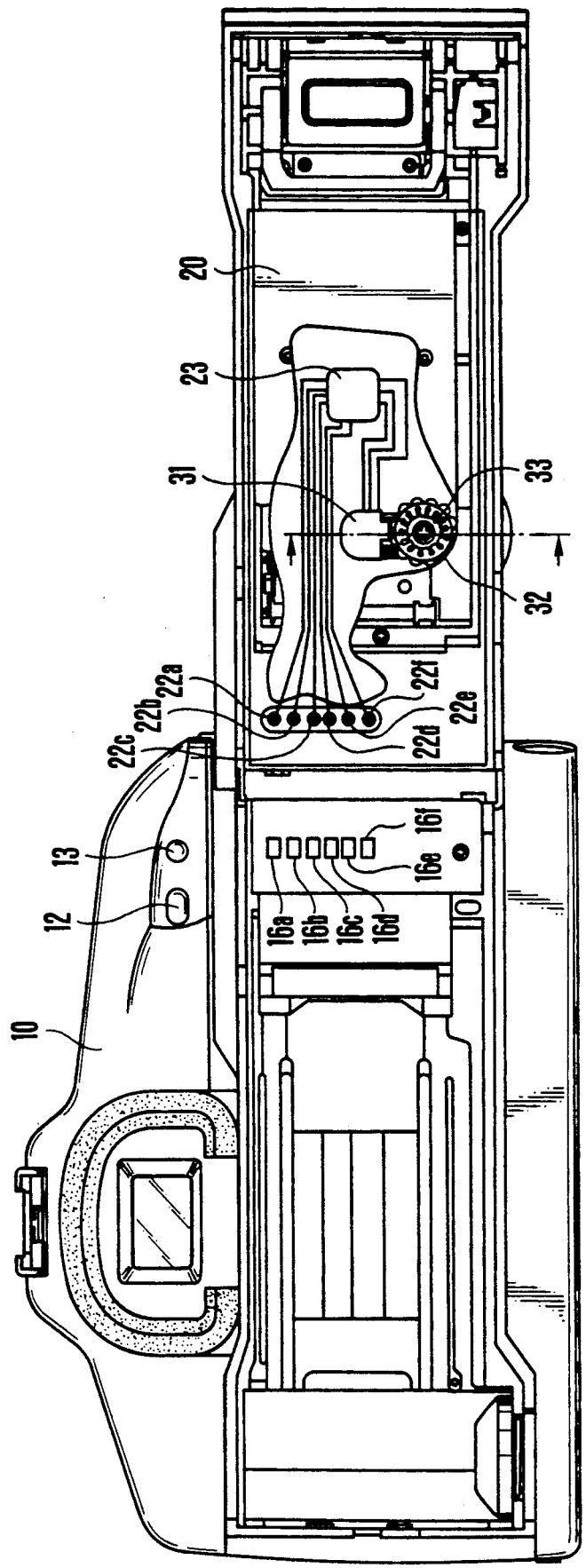
FIG. 5 is a back view, partly in section, of the camera of FIG. 1 with the back cover opened.

FIG. 5 shows the inside of the back cover 20 of the camera with a portion broken to illustrate the interior thereof. When the back cover 20 is closed, a group of patches 16a-16f on a framework of the camera body 10 comes into contact respectively with a group of terminals 22a-22f for input information signal transmission on the inner surface of the back cover 20, so that the information signals are transmitted to a control circuit in the camera body 10.

A signal generating circuit 23 of the back cover 20 side is responsive to rotation of the dial 30 for producing pulse signals which are applied to the control circuit of the camera body 10.

Figure 6:
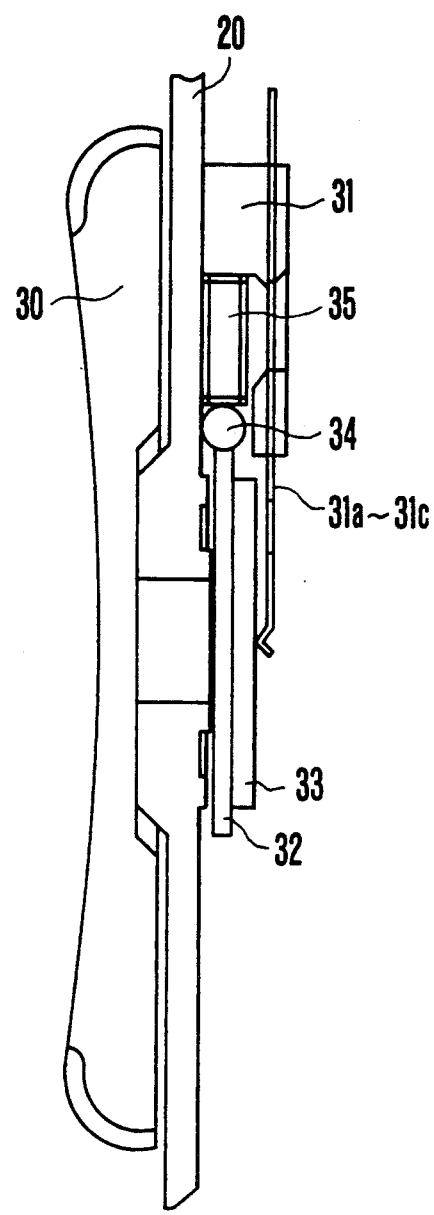
FIG. 6 is a sectional view in enlarged scale of the dial of FIG. 3 and associated parts therewith.
Figure 7:
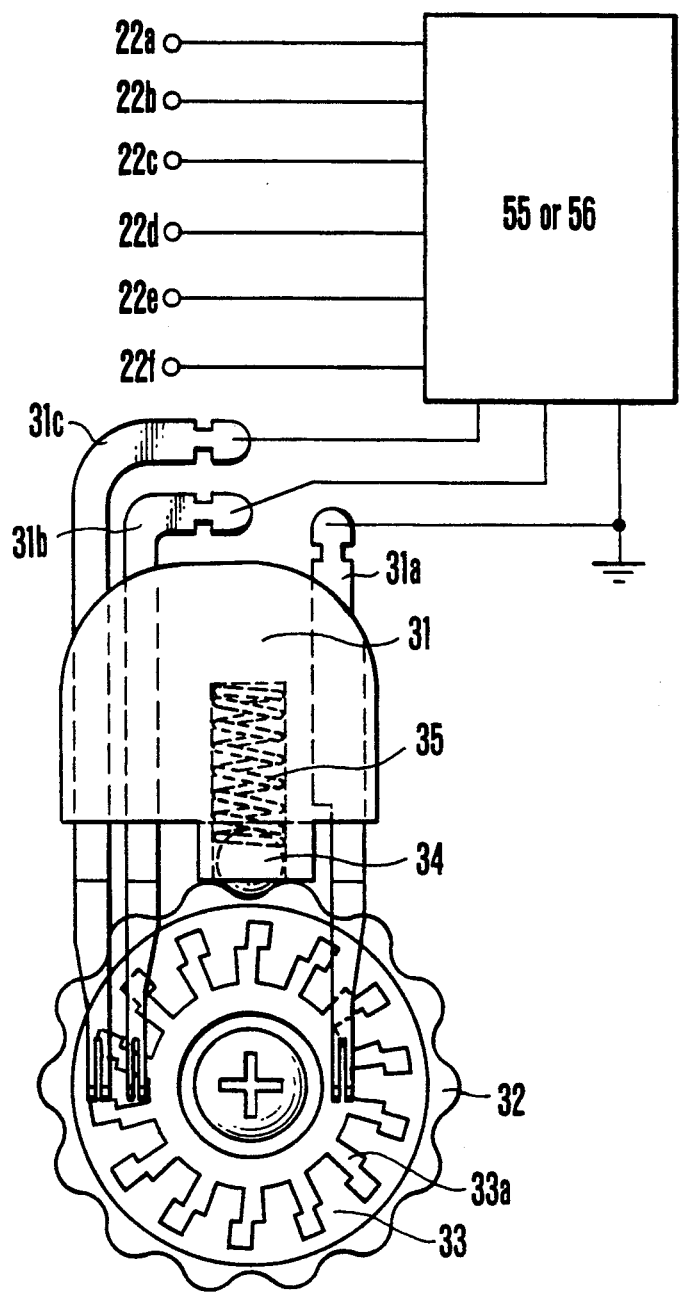
FIG. 7 is a plan view schematically illustrating the patterns of the dial of FIG. 6.

FIG. 6 shows the cross section of a dial unit, and FIG. 7 is a view in enlarged scale of the dial unit. A dial probe 31 has three sliders 31a-31c in contact on patterns 33a of a dial substrate 33 which rotates along with rotation of the dial 30 and produces output signals. A click plate 32 rotates in unison with the dial 30. A ball 34 is urged by a spring 35 to press against one of the crest and valley portions of the click plate 32. Thus, equally divided clicks are given to the dial 30.

Figure 8:
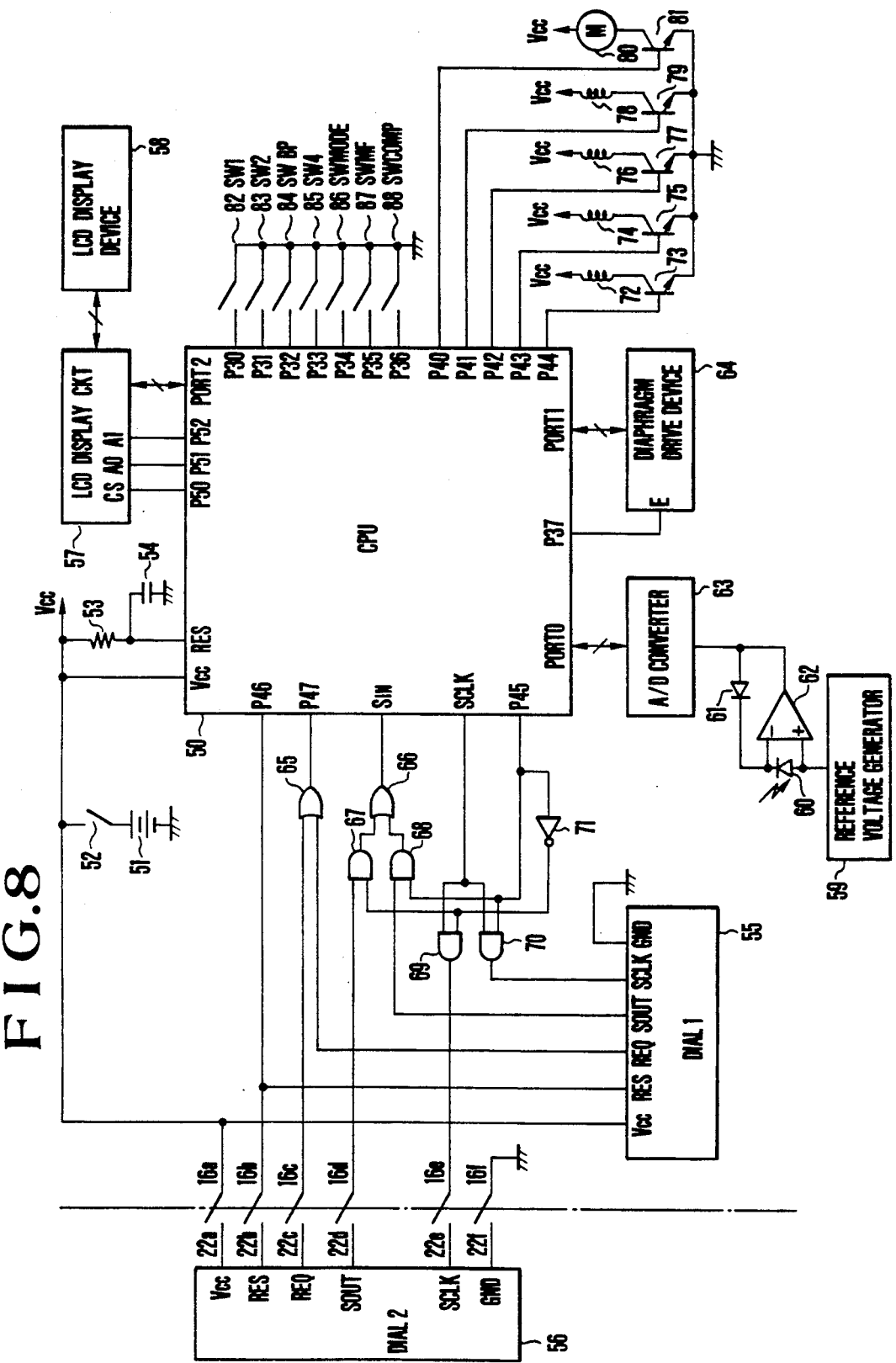
FIG. 8 is an electrical circuit diagram of the entirety of a first embodiment of a camera according to the invention.

Next, the entire circuit of an embodiment of the camera according to the invention is described by reference to FIG. 8.

Figure 9:
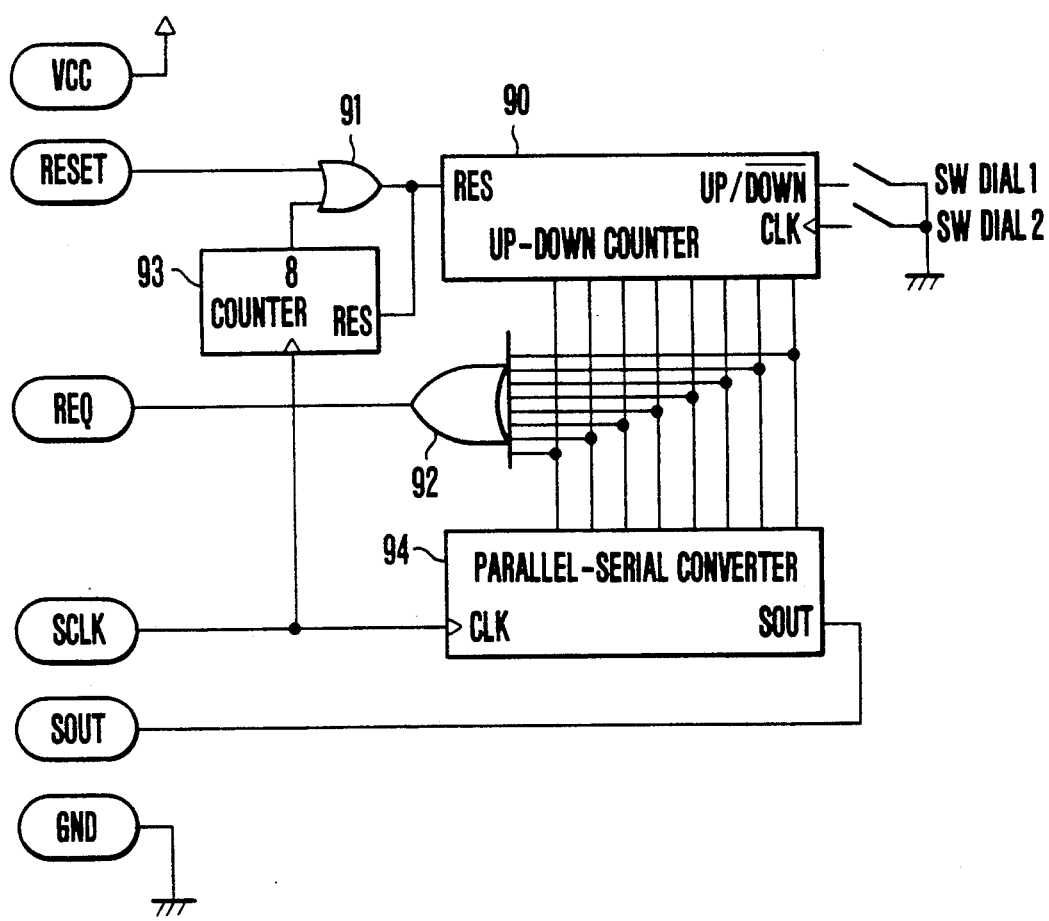
FIG. 9 illustrates the details of the dial circuit of FIG. 8.
Figure 10A:
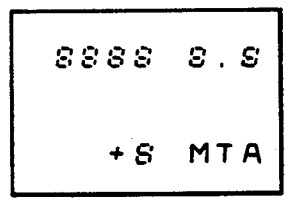
FIGS. 10(a) to 10(i) are plan views of examples of items of information presented on the display LCD.

50: A microcomputer (hereinafter called "CPU") for governing the control of the camera.
Vcc: An electric power source terminal;
RES: A reset terminal;
PORT0: An 8-bit parallel input port;
PORT1 & PORT2: 8-bit parallel output ports;
P30, P31, P32, P33, P34, P35, P36 & P37: Input Ports;
P40, P41, P42, P43, P44, P45 & P46: Output Ports;
P47: An input port;
P50, P51 & P52: Output Ports;
SCLK: A clock output for serial communication;
SIN: A data input for serial communication;
51: An electric power source;
52: A switch for making the electric power source;
53: A resistor;
54: A capacitor for resetting the CPU 50 when the electric power source is made;
55: A dial circuit for reading the input value by the dial 15;
56: A dial circuit for reading the input value by the dial 30;
Incidentally, the details of the dial circuit will be explained by reference to FIG. 9.
57: A publicly known LCD display circuit;
58: An LCD display device of which all display patterns are shown in FIG. 10(a);
The LCD display circuit 57 operates in such a manner that when the input terminal CS is at "1", addresses A0 and A1 and 8-bit data are taken in and displayed on the LCD display device 58. The relationship between the data and the display is shown in the table of FIG. 16.
59: A reference voltage generator;
60: An SPC for measuring the brightness of an object to be photographed;
61: A logarithmic compression diode;
62: An operational amplifier;
63: An A/D converter receptive of the output of the operational amplifier 62 for producing an output in 8-bit data form representing the measured value of light;
64: A publicly known diaphragm drive device for stopping down the lens to the value of the PORT1 output of the CPU 50 upon completion of this operation to produce "1" at an output terminal E;
65 & 66: OR gates;
67, 68, 69 & 70: AND gates;
71: An inverter;
72: A magnet for making a trailing curtain of a shutter run;
73: A transistor for controlling the supply of electric power to the magnet 72;
74: A magnet for making a leading curtain of the shutter run;
75: A transistor for controlling the supply of electric power to the magnet 74;
76: A magnet for driving the diaphragm drive device 64;
77: A transistor for controlling the supply of electric power to the magnet 76;
78: A magnet for actuating the start of a sequence of operations of mechanisms (not shown);
79: A transistor for controlling the supply of electric power to the magnet 78;
80: A winding motor;
81: A transistor for controlling the supply of electric power to the motor 80;
82: A light measuring switch (hereinafter called "SW1") which turns on by a first stroke of the release button 14;
83: An exposure switch (hereinafter SW2) which turns on by a second stroke of the release button 14;
84: A back cover switch (hereinafter SWBP) which turns off when the back cover 20 opens, and on when the back cover closes;
85: A switch (hereinafter SW4) which turns on when a mirror is up, and off when the winding is completed;
86: A mode changing switch (hereinafter SWMODE);
87: A function changeover switch (hereinafter SWMF);
88: A switch which turns on once the exposure compensation button 12 is pushed (hereinafter SWCOMP);
FIG. 9 shows the details of the dial circuit 55 or 56.
90: An up-down counter;
91 & 92: OR gates;
93: A counter;
94: A parallel-serial converter.

When a terminal RESET is high, the OR gate 91 also produces a high-level output, clearing the counters 90 and 93. Hence, the counters 90 and 93 start to operate when the terminal RESET becomes low.

The up-down counter 90 has inputs UP/$\overline{\text{DOWN}}$ and CLK connected to dial switches SWDIAL1 and SWDIAL2 respectively. In the case of the dial circuit 55, the dial switch SWDIAL1 corresponds to the slider 31b, and the dial switch SWDIAL2 to the slider 31c. In the case of the dial circuit 56, because having similarity, their illustration is not given. Yet, the aforesaid inputs are connected to the respective sliders of another dial probe which cooperates with the dial 15. Here the case of the dial circuit 55 is described.

When the dial 30 turns one click clockwise, as shown in FIG. 11(a), the dial switch SWDIAL2 turns on, then the dial switch SWDIAL1 on, then the SWDIAL2 off and then the SWDIAL1 off. The up-down counter 90 is so constructed as to do counting when the input at the clock terminal CLK rises to high level. Therefore, because at a time when the dial switch SWDIAL2 is off, the dial switch SWDIAL1 has already come into the ON state, the up-down counter 90 operates in the down count mode. Conversely when the dial 30 turns one click counterclockwise, the signals at the inputs change in such a sequence that, as shown in FIG. 11(b), the dial switch SWDIAL1 turns on, then the dial switch SWDIAL2 on, and then further the SWDIAL1 off and then the SWDIAL2 off. Therefore, when the dial switch SWDIAL2 is off, the dial switch SWDIAL1 has already come into the OFF state. Therefore, the up-down counter 90 operates in the up count mode.

In such a manner, the up-down counter 90 can be made to count one unit down each time the dial 30 rotates one unit click in the clockwise direction, or to count, one up when in the counterclockwise direction. The OR gate 92 produces an output of high level when the output of the up-down counter 90 is not "0".

The CPU 50, when a terminal REQ of the dial circuit 56 has become high, judges that the dial 30 has been rotated and performs a serial communication. In synchronism with the clock of a terminal SCLK of the dial circuit 56, the up-down counter 90 produces a counted value as serial data at a terminal SOUT, and, at the same time, the counter 93 counts the waves of the terminal SCLK on completion of eight clocks (for one communication) to produce an output of high level which is applied to the OR gate 91.

The OR gate 91 changes its output to high level, clearing the up-down counter 90 and the counter 93 at once. When the counter 93 is cleared, it drops its output to the OR gate 91 to low level, and returns to the initial state.

By clearing the up-down counter 90 after the communication has been performed up to 8 bits, the counted value of the dial can be read.

The operation of the circuit is described with reference to the flowcharts shown in FIGS. 12(a), 12(b), 13(a), 13(b), 13(c), 14(a), 14(b) and 14(c). The first state is assumed to be with all the switches off, in other words, a state that the winding is completed and the back cover is open.

When the electric power source switch 52 is closed, the voltage of the battery 51 is supplied to a VCC line. From this on, the capacitor 54 is gradually charged through the resistor 53. The potential at the terminal RES of the CPU 50 is thus kept low for a predetermined time in order to insure that the CPU 50 is reset. Thereby the CPU 50 is allowed to begin the start of procedure of operation from the "RESET" of the flowchart.

(Step S1) Initialize registers, ports and flags.

MODER, COMPR, TVR, AVR, MFR, SVR, DIAL1R and DIAL2R stand for registers within the CPU 50, and have respective reasonable values put therein. For the MODER, the value "1" represents the manual mode; "2" the shutter priority and "3" the aperture priority.

Also, BPF, MFING, SWMFF, SW1DIAL, CHGDIAL and DIAL2EN are flags within the CPU 50. Each of these is cleared to "0". Each of the output ports, too, is cleared.

(Step S2) Output high at an output terminal P46.
(Step S3) Wait a predetermined time.
(Step S4) Drop the output port P46 to low.

By the steps S2 to S4, the dial circuits 55 and 56 are reset.

(Step S5) Test the back cover switch SWBP. If, by now, the back cover 20 is open, the program advances to a step S6. If closed, it advances to a step S23.

(Step S6) Clear the flag BPF representing the back cover state.
(Step S7) Clear the flag DIAL2EN representing whether the dial 30 is present or absent.
(Step S8) Examine the flag MFING representing the setting of multi-function. If it is "1", the program advances to a step S87. If it is now "0", the program advances to a step S9.
(Step S9) Test the MF (multi-function) switch 87 (SWMF). If off, the program advances to a step S10.
(Step S10) Test the MR switch 85 (SW4). If off, the program advances to a step S11.
(Step S11) Test the mode switch 86 (SWMODE). Because of this being off, the program advances to a step S12.
(Step S12) Test the input port P47. If the dial 30 is not rotated, it is "0". So the program advances to a step S13.
(Step S13) Test the light measuring switch 82 (SW1). When it is off, the program advances to a step S14.
(Step S14) If the AE mode register MODER is "3" (aperture priority), the program advances to a step S16. Otherwise, it will advance to a step S15.
(Step S15) Transfer the value of the shutter register TVR to a buffer LCD1R for LCD display.
(Step S16) Clear this buffer LCD1R to "0".
(Step S17) If the AE mode register MODER is "2" (shutter priority), the program advances to a step S19. Otherwise, it will advance to a step S18.
(Step S18) Transfer the value of the aperture register AVR to a buffer LCD2R for LCD display.
(Step S19) Clear this buffer LCD2R to "0".
(Step S20) Store the value of the register COMPR in a buffer LCD3R for LCD display.
(Step S21) Store the value of the register MODER in a buffer LCD4R for LCD display.

The execution of the steps S14 to S21, therefore, now results in that the buffer LCD1R for LCD display stores "5" (the set value of the shutter register TVR by the step S1), even the buffer LCD2R likewise stores "5" (the set value of the aperture register AVR by the step S1), the buffer LCD3R stores "0", and the buffer LCD4R stores "1".

(Step S22) Call a display subroutine to carry out displaying on the LCD display device 58.

Figure 14A:
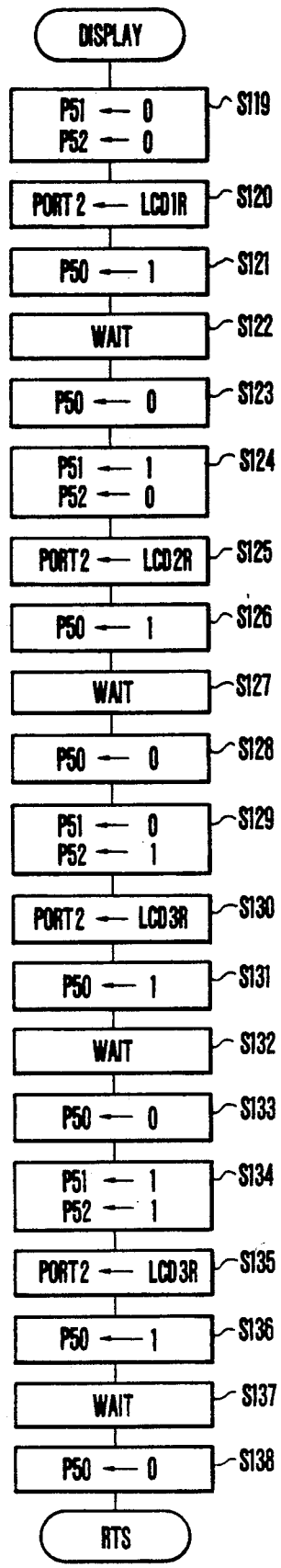

Here the display subroutine is described by reference to the flowchart of FIG. 14(a).

(Step S119) Output "00" to addresses A0 & A1.
(Step S120) Output the value of the buffer LCD1R for LCD display to the output port PORT2.

Here "5" is outputted.

(Step S121) Output high to the output port P50.
(Step S122) Wait a predetermined time.
(Step S123) Return the output port P50 to low.

Responsive to a high signal of the output port P50 in the procedure of the steps S121 to S123, the LCD display circuit 57 takes the addresses and the data in and presents a display. In this case, the display is "30". This means that the shutter time is 1/30 sec.

Figure 10F:
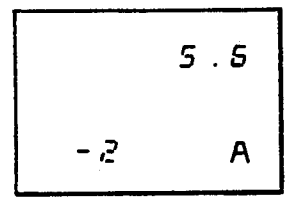
Figure 10B:
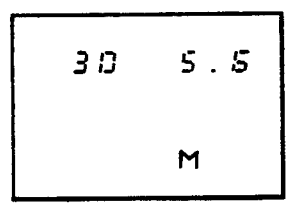
Figure 10G:
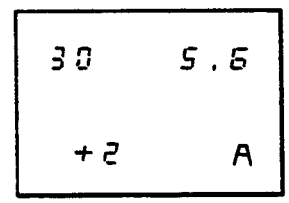
Figure 10C:
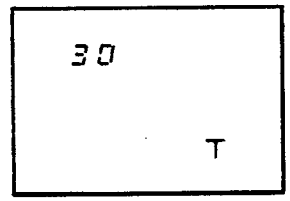
Figure 10H:
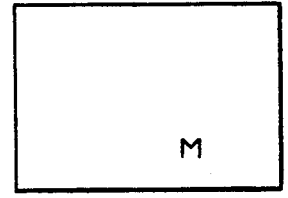
Figure 10D:
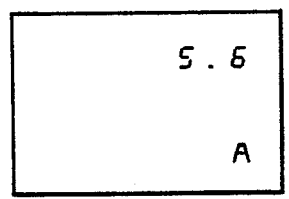

Steps S124 to S138 are similar on execution in sequence with the result that the addresses 01, 10 and 11 get the values of the buffers LCD2R, LCD3R and LCD4R for LCD display respectively. On the LCD display device 58, therefore, shutter: 1/30 sec., aperture: F5.6 and mode: M (manual) are displayed as shown in FIG. 10(b). If the register MODER is now "2" (shutter priority), the procedure of the steps S14 to S21 results in that the buffer LCD1R for LCD display, the register TVR, the buffer LCD2R for the same and the buffer LCD3R for the same are "0" and the buffer LCD4R for the same is "2". Therefore, another display is presented as shown in FIG. 10(c). Also likewise, for the register MODER=3, such a display as shown in FIG. 10(d) is presented. As has been described above, if, as nothing is done, all the switches are off, the control for the loop: Step S5→step S10→Step S11→Step S13→Step S22→Step S5 repeats itself, thus continuing displaying the mode, the shutter time value and the aperture value. Hereinafter let us call this the "main loop".

Suppose the back cover 20 is closed at a time during the repeating of the main loop control, then at the step S5, branch to a step S23 occurs.

(Step S23) Discriminate the flag BPF. Because it has been set to "0" in the step S6, the program advances to a step S24.

(Step S24) Output "1" to the output port P46. The dial circuits 55 and 56 are reset.

(Step S25) Output "0" to the output part P45. Therefore, the output of an inverter 71 becomes high, opening AND gates 69 and 67 to select the dial circuit 56 of the back cover side.

(Step S26) Carry out serial communication. A clock for the serial communication from the CPU 50 is sent through the AND gate 69 to the SCLK terminal of the dial circuit 56.

In synchronism with this, the value of the up-down counter 90 is read out and goes through the AND gate 67 to be stored in an accumulator register (hereinafter abbreviated to the register "A") in the CPU 50. This fact that the reading of the up-down counter 90 can be performed is used in confirming that the back cover 20 has surely been assembled with.

(Step S27) Return the output port P46 to "0".
(Step S28) Discriminate the value of the register A.

Because the RESET terminal is high, the up-down counter 90 is cleared and the serial outputs of the dial circuit 56 all become zero. Therefore, branch to a step S30 occurs and the DIAL2EN flag is set.

Alternatively assuming that the ordinary back cover having no dial circuit 56 is used instead, then the terminals 16a to 16f all get open, so that the data for serial communication become high. Therefore, the register A is not zero. Hence, a step S29 clears the DIAL2EN flag. (step S31) Set the BPF flag. After that, the program returns to the step S8.

It is after this that the procedure past the display process has returned again to the step S5 with the result that the BPF flag is being set. At the step S23, therefore, branch to the step S31 occurs, so that the resetting of the dial circuits 55 and 56 is not carried out. In short, only once when the back cover 20 is closed, the dial circuits 55 and 56 are reset and whether or not the dial circuit 56 is present can be discriminated. Also, when the back cover 20 is later opened again, the BPF flag is cleared in the step S6. Thus, each time the back cover 20 is opened and closed, they can be reset for once.

In the conditions that the back cover 20 is closed and that the dial circuit 56 is in connection, rotation of the dial 15 or the dial 30 causes an REQ terminal of the dial circuit 55 or 56 to rise up, which in turn causes the input port P47 to change to high level through the gate 65.

Because of this, at the step S12, branch to a step S33 occurs.

(Step S33) Call a dial read subroutine.

Figure 14B:
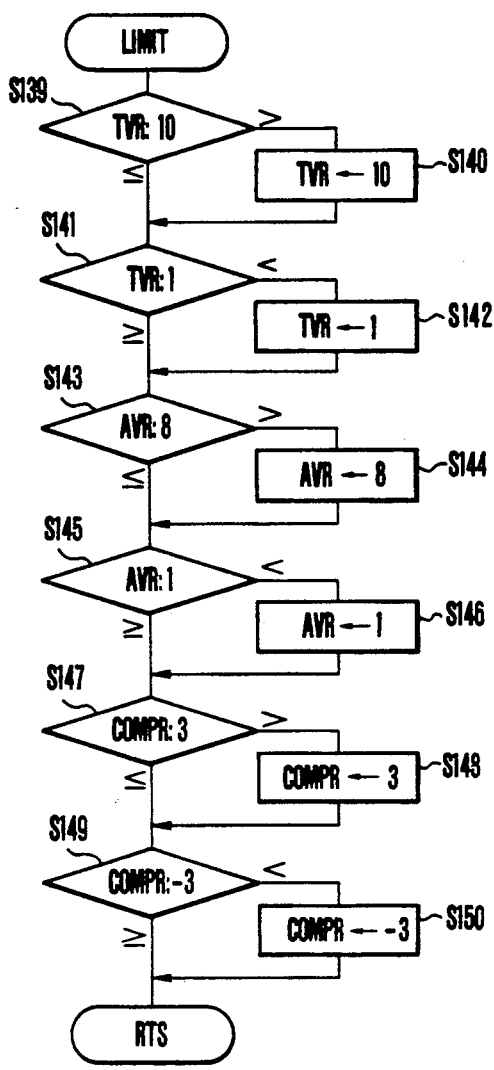
Figure 14C:
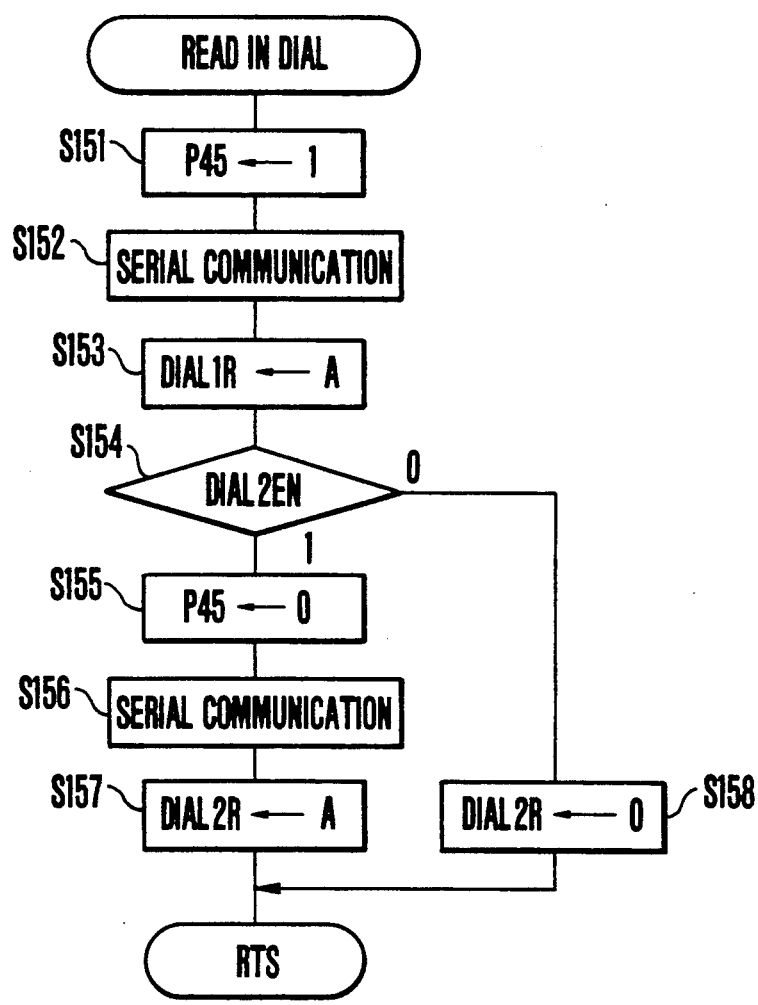

The dial read subroutine is described by reference to FIG. 14(c).

(Step S151) Output "1" to the output port P45. Therefore, the output of the inverter 71 becomes low, opening the AND gates 68 and 70 to select the dial circuit 57 of the body side.

(Step S152) Perform serial communication. The clock for serial communication from the CPU 50 (at the SCLK terminal) is sent through the AND gate 70 to the SCLK terminal of the dial circuit 57.

In synchronism with this, the value of the up-down counter 90 is read out, goes through the AND gate 67 and is stored in the register A of the CPU 50.

(Step S153) Store the value of the register A in a register DIAL1R (count register for the dial 15).

(Step S154) Discriminate the DIAL2EN flag. If the dial circuit 56 is in connection, and the DIAL2EN flag is "1", the program advances to a step S155.

(Step S155) Output "0" to the output port P45 for selection of the dial circuit 56 of the back cover side.

(Step S156) and (Step S157) Perform a similar serial communication to that of the step S152 and the step S153.

The value of the up-down counter 90 is written in a register DIAL2R. Then the program returns to the main flow.

Also, if the dial circuit 56 for the back cover dial 30 is not in connection, the program branches from the step S145 to a step S158, clears the register DIAL2R and returns to the main flow.

This subroutine enables the counted values of the dials 15 and 30 to be read in the registers DIAL1R and DIAL2R respectively.

(Step S34) Discriminate the value of the register MODER for AE mode. If it is "1" (manual mode), the program advances to a step S35.

(Step S35) Discriminate a CHGDIAL flag for changing over between the TV and AV settings when in the manual mode. Since, in this case, it has been cleared in the step S1, the program advances to a step S36.

(Step S36) Add the value of the dial count register DIAL2R of the back cover side to the aperture register AVR.

By this, the aperture value can be altered by a number of clicks of rotation of the dial 30. For example, when the dial is rotated two clicks in the counterclockwise direction, the value of the up-down counter 90 becomes "2". Therefore, the register DIAL2R also becomes "2". The aperture register AVR, as 5.2 is made, gets "7".

(Step S37) Discriminate SWCOMP (exposure compensation switch). Now if off, the program advances to a step S38.

(Step S38) Alter the shutter time by adding the value of the dial count register DIAL1R of the body side to the value of the shutter register TVR. For example, when the dial 15 is rotated one click in the clockwise direction, the value of the up-down counter 90 becomes "−1" and, therefore, the register DIAL1R also becomes "−1". The shutter register TVR, as 5-1 is made, gets "4".

And, in a step S52, a limit subroutine is called.

The limit subroutine is described by reference to FIG. 14(b).

(Step S139) Discriminate whether the shutter register TVR is larger than "10".

(Step S140) If the shutter register TVR is larger than "10", set the register TVR to "10".

(Step S141) Discriminate whether the shutter register TVR is smaller than "1".

(Step S142) If the shutter register TVR is smaller than "1", set the register TVR to "1".

Therefore, if the shutter register TVR is in between "1" and "10", it is left as it is. If larger than "10", then limitation is laid at "10", and further, if smaller than "1", then at "1".

(Step S143) to (Step S150) also lay limitations likewise on the aperture register AVR to between "1" and "8", and also on the exposure compensation register COMPR to between "−3" and "3". Then return to the main flow occurs.

(Step S14) to (Step S22) Display on the LCD. For now, because the shutter register TVR is "4" and the aperture register AVR is "7", such a display as shown in FIG. 10(e) is presented.

In such a manner, the shutter time can be altered to a desired value by the dial 15, and the aperture to a desired value by the dial 30. Also, their results can be confirmed by looking at the LCD display.

If the back cover 20 does not have the dial circuit 56, or when the back cover 20 is being open, the count register DIAL2R for the dial 30 is always cleared to "0" in the step S158. Hence, the aperture value cannot be altered in the step S36. For this case, while pushing an exposure compensation switch 88 (SWCOMP), the user may turn the dial 15. Then at the step S37, branch to a step S39 occurs.

(Step S39) Add the dial count register DIAL1R for the dial 15 to the aperture register AVR.

Therefore, by rotating the dial 15, it is also possible to alter the aperture value under a condition of pushing the exposure compensation switch 88 (SWCOMP), or to alter the shutter time under another condition of not pushing it.

Also, for some of the users, a situation will be encountered where they want to exchange the roles of the dial 15 and the dial 30 when in the manual mode. To this purpose, there are provided the CHGDIAL flag for changing over between the TV and AV settings when in the manual mode.

If the CHGDIAL flag has been set by a function set mode to be described later, branch to a step S40 occurs at the step S35.

(Step S40) to (Step S43) are almost similar to the step S36 to the step S39 and differ only in that the shutter register TVR and the aperture register AVR are completely interchanged with each other. Therefore, the dial 15 can be used in altering the aperture value, and the dial 30 in altering the shutter time value. Of course, it is also possible to do the shutter time alteration, while maintaining the exposure compensation switch 88 (SWCOMP) in ON state, or the aperture alteration while in OFF state.

In a case where the AE mode register MODER is other than "1", that is, the shutter priority, or the aperture priority, is in use, branch to a step S44 occurs at the step S34.

(Step S44) Discriminate the SW1DIAL flag. Since this has been cleared in the step S1, the program advances to a step S46.

(Step S46) Add the value of the dial count register DIAL2R for the dial 30 to the exposure compensation register COMPR. Therefore, by rotating the dial 30, the exposure compensation value of the register COMPR can be altered. For example, when the dial 30 is rotated two clicks in the counterclockwise direction, the register DIAL2R becomes "2". Therefore, the exposure compensation register COMPR also becomes "2".

(Step S47) Discriminate the exposure compensation switch 88 (SWCOMP). If off, the program advances to a step S48.

(Step S48) Discriminate the register MODER for AE mode. If "2" (the shutter priority), branch to a step S50, or if the aperture priority, to a step S49, occurs.

Therefore, by rotating the dial 15, the shutter time value, if the shutter priority, or the aperture value, if the aperture priority, can be altered.

After the upper and lower limits have been set in the step S52, the respective mode is displayed. Because, in this instance, the exposure compensation register COMPR is "2", the display becomes as shown in FIG. 10(f).

Also, similarly to the manual mode, in the case of the dial circuit 56 not in connection, by rotating the dial 15 while turning on the exposure compensation switch 88 (SWCOMP), branch to a step S51 occurs at the step S47. Thus, it is also possible to alter the exposure compensation value.

On account of a case where as it is easily done, the user suffers from unintentional alterations of the exposure compensation value, it is made possible to set the SW1DIAL flag by the function set mode to be described later. In this case, at the step S44 there occurs branch to a step S45.

(Step S45) Discriminate the light measuring switch 82 (SW1). If that switch 82 (SW1) is off, the program does not go to a step S46. Therefore, the exposure compensation value cannot be altered however long the user rotates the dial 30.

It is only when the turning on of the light measuring switch 82 (SW1) and rotating of the dial 30 simultaneously occur that the exposure compensation value becomes possible to alter.

For alteration of the mode, it can be done by turning on the mode switch 86 (SWMODE).

Figure 13A:
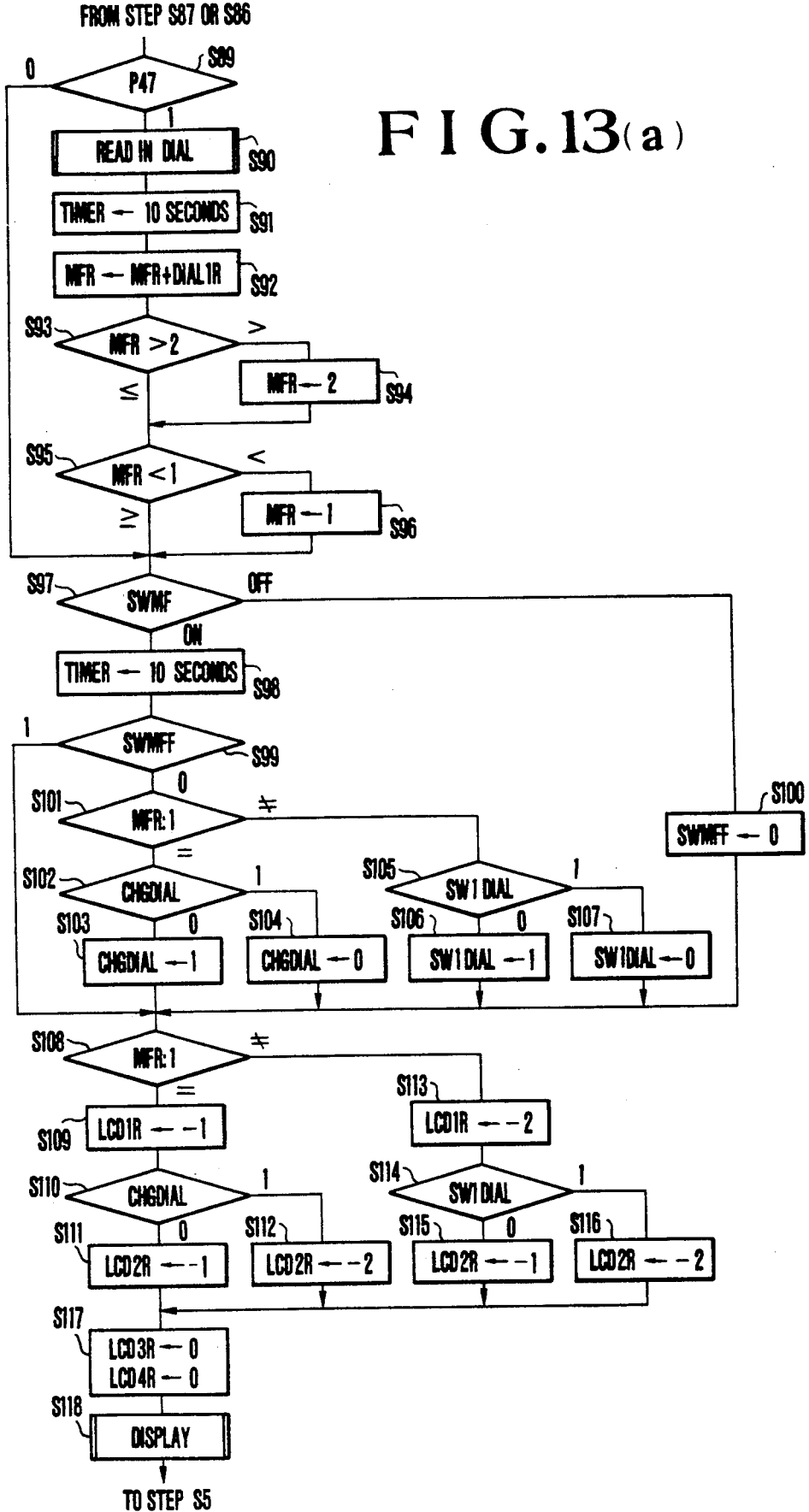
Figure 13B:
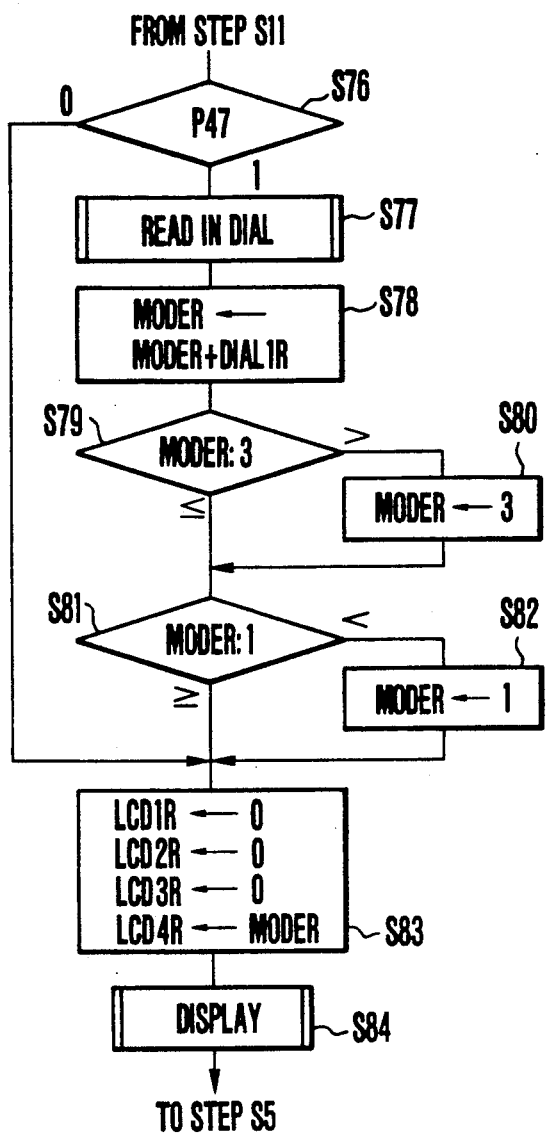
Figure 13C:
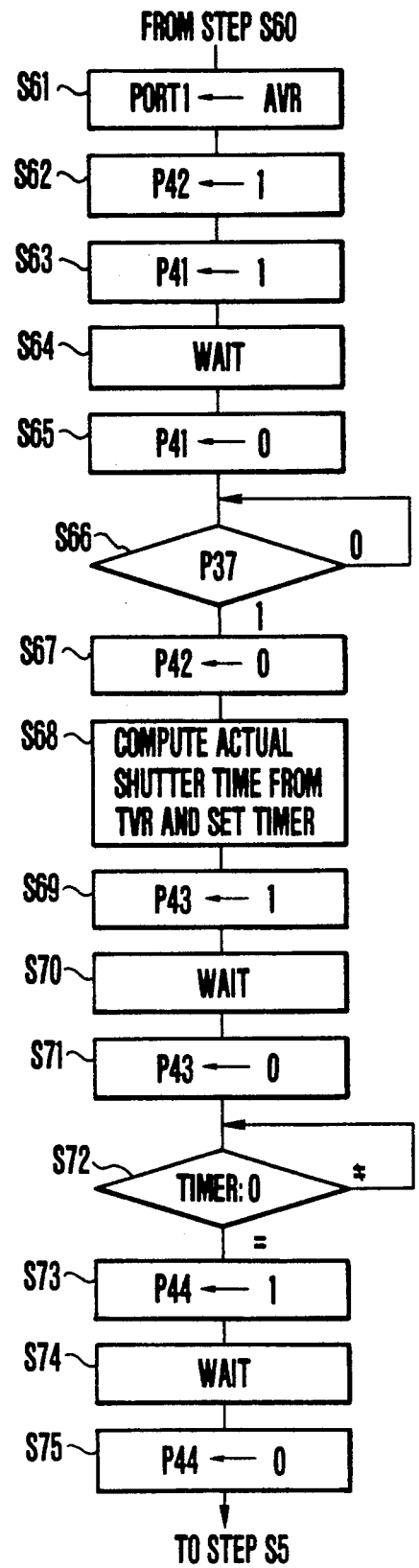

As the display continues operating by the loop of the main flow, when the mode switch 86 (SWMODE) turns on, branch from the step S11 to a step S76 shown in FIG. 13(b) occurs.

(Step S76) If the dial is not rotated yet, the input port P47 is "0". Therefore, the program advances to a step S83.

(Step S83) Clear the buffers LCD1R to LCD3R for LCD display and store the value of the register MODER for AE mode in the buffer LCD4R for LCD display.

(Step S84) Call the display subroutine. As shown in FIG. 10(h), the present mode only is displayed. Then return to the step S5 occurs. Subsequently, so long as the mode switch 86 (SWMODE) is maintained in the ON state, a loop: step S5→step S10→step S11→step S76→step S84→step S5 repeats itself.

By rotating the dial 15 while turning on the mode switch 86 (SWMODE), the input port P47 becomes high, causing occurrence of a skip at the step S76 to a step S77.

(Step S77) Call the dial read subroutine.

(Step S78) Add the dial count register DIAL1R for the dial 15 to the register MODER for AE mode.

(Step S79) to (step S82) are a routine for limiting the mode to a range between "1" and "3". With this, it is made possible that by counterclockwise movement of the dial the mode alters in a way: manual M→shutter priority T→aperture priority A, or by clockwise movement in another way: A→T→M.

After the end of the setting, the user will turn off the mode switch 86 (SWMODE). As the main loop begins, the newly set mode is then displayed.

As the main loop is being recycled, when the photographer aiming the camera at an object to be photographed pushes the release button to the first stroke, the light measuring switch 82 (SW1) is turned on. So, exposure compensation by the dial 30 becomes possible in the step S45, and, at the same time, branch from the step S13 to a step S53 occurs.

(Step S53) Read the measured value of the brightness of the object in the A/D converted form from the port PORT0 and add the film sensitivity and the exposure compensation value. Here the film sensitivity register SVR has any value in a range of "1" to "5" (or the APEX value of ISO 100), and the exposure compensation value is equal to the value set in the exposure compensation register COMPR. That result is stored in the register SVR.

(Step S54) Discriminate AE mode. If the shutter priority, the program advances to a step S55, or if the aperture priority, to a step S56, or if the manual, to a step S57.

(Step S55) Compute a proper aperture value by EV-TV and store it in the aperture register AVR.

(Step S56) Compute a proper shutter time value by EV-AV and store it in the shutter register TVR.

(Step S57) Call the limit subroutine to lay limitations on the aforesaid registers TVR and AVR.

In such a manner, computation could be done in each mode.

(Step S58) Transfer the value of the register TVR to the buffer LCD1R for LCD display, the value of the register AVR to the buffer LCD2R for the same, the value of the register COMPR to the buffer LCD3R for the same, and the value of the register MODER to the buffer LCD4R for the same.

(Step S59) Call the display subroutine. Therefore, the LCD display device 58 presents such a display as shown in FIG. 10(g). The display for each mode becomes common except for the mode display portion.

(Step S60) If, as the exposure switch 83 (SW2) is tested, it is not turned on yet, the program returns to the step S5 and the loop: Step S5→Step S10→Step S12→Step S13→Step S59→Step S5 is recycled so long as the light measuring switch 82 (SW1) remains turned on, thus carrying out the light measurement display.

At a time when the measured value of light is displayed, the photographer will push the release button further to the second stroke, thereby turning on the exposure switch 83 (SW2). Therefore, branch from the step S60 to a step 61 shown in FIG. 13(c) occurs.

(Step S61) Output the aperture register AVR (the aperture value) at the output port PORT1.

(Step S62) to (Step S63) Output high at the output ports P41 and P42 and turn on the transistors 77 and 79 to supply electric power to the magnets 76 and 78. Then, by the magnet 78, a mechanical latch (not shown) is unlocked, so that the mirror is up. By the magnet 76, the diaphragm is stopped down.

(Step S64) to (Step S65) After having waited for a predetermined time, stop the supply of electric power to the magnet 78.

(Step S66) Wait for completion of the stopping down. Under the condition the latch is out of lock, and the magnet 76 is being energized, the diaphragm goes stopping down mechanically. When the size of the aperture opening is decreased to the predetermined value, the diaphragm drive circuit 64 produces an output of high level and the input port P37 becomes "1". Thus, one can know the completion of the aperture control.

(Step S67) Change the output of the output port P42 to low level to cut off the supply of electric power to the magnet 76.

(Step S68) Compute the actual time from the APEX value of TV and set a timer to it.

(Step S69) to (Step S71) Supply electric power to the magnet 74, causing the leading curtain of the shutter to run.

(Step S72) Wait until the timer expires the actual time.

(Step S73) to (Step S75) Supply electric power to the magnet 72, causing the trailing curtain of the shutter to run.

By such a procedure, the diaphragm and the shutter can be controlled. After a sequence of release operations is completed, return to the step S5 occurs.

The main loop repeats itself from its start. Since at this time the releasing is complete, because the MR switch 85 (SW4) which turns on when the mirror is up and turns off when the winding is completed is in the ON state, branch from the step S10 to a step S159 occurs.

(Step S159) Output "1" at the output port P40 and turns on the transistor 81 to supply electric power to a motor 80. Thus, a winding operation is started. (Step S160) Wait until the MR switch 85 (SW4) turns off. (Step S161) Terminate the supply of electric power to the motor when the one-frame winding operation is completed.

As has been described above, the light measuring, exposure making and winding controls can be done.

In final, the function set mode is described.

By turning on the MF switch 89 (SWMF), entrance to the function set mode can be done.

As the main loop continues being recycled, when the MF switch 87 (SWMF) turns on, branch to a step S85 occurs at the step S9.

(Step S85) Raise "1" at the MFING flag for multi-function setting.

(Step S86) Raise "1" at the SWMFF flag representing the state of the MF switch 87 and go to a step S89 shown in FIG. 13(a).

(Step S89) Discriminate whether the dial has been rotated. If not rotated, the program advances to a step S97.

(Step S97) Check the state of the MF switch 87 (SWMF). If on, the program advances to a step S98.

(Step S98) Set 10 sec. in the timer.

(Step S99) Judge the SWMFF flag. In this case, it has been set in the step S85. So the program advances to a step S108.

(Step S108) Discriminate the value of the MF set register MFR. Because it is set to "1" in the step S1, the program advances to a step S109.

(Step S109) Set "−1" in the buffer LCD1R for LCD display.

(Step S110) Discriminate the CHGDIAL flag representing the changeover between the TV and AV when in the manual mode.

(Step S111) If the CHGDIAL flag is "1", set "−1" in the buffer LCD2R for LCD display.

(Step S112) If the CHGDIAL flag is "0", set "−2" in the same buffer LCD2R.

(Step S117) Clear the buffers LCD3R and LCD4R for the same.

(Step S118) Call the display subroutine.

Figure 10I:
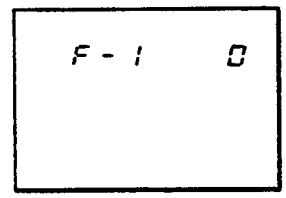
Figure 10E:
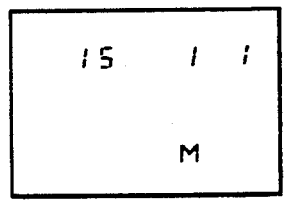
Figure 12A:
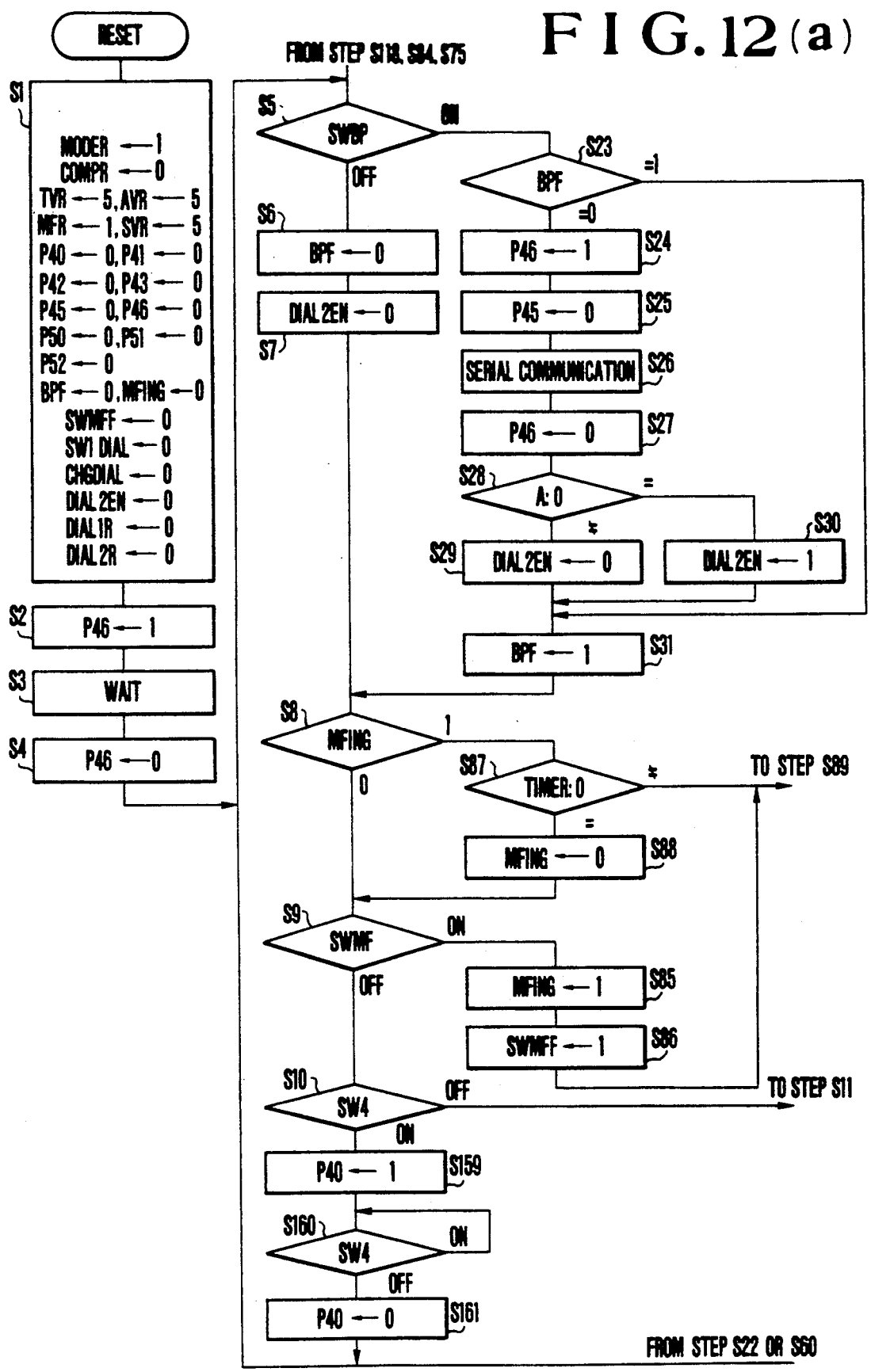
FIGS. 12(a), 12(b), 13(a), 13(b), 13(c), 14(a), 14(b) and 14(c) are flowcharts.
Figure 12B:
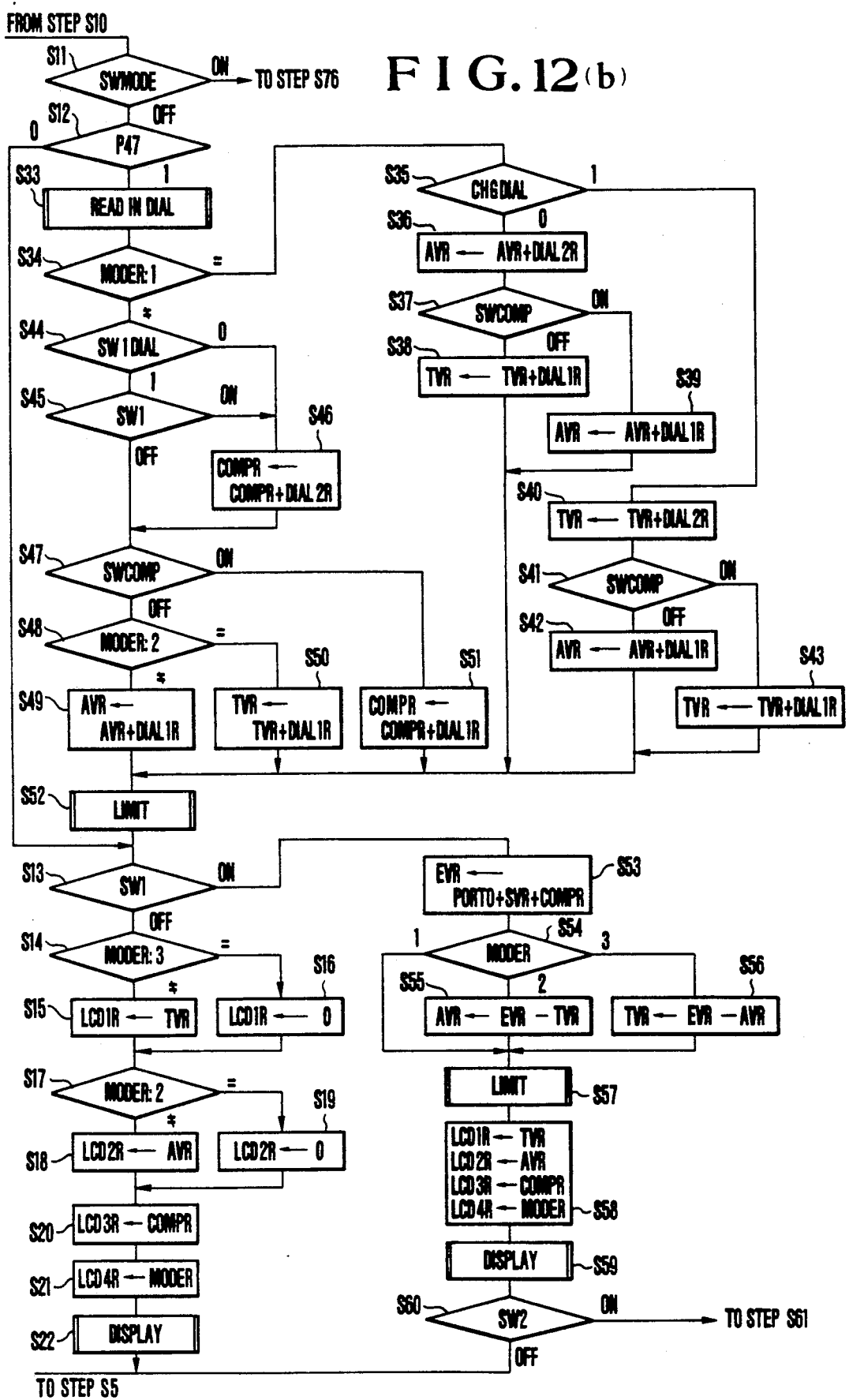

Therefore, the display becomes as shown in FIG. 10(i).

"F−1" indicates that at the present the alteration of the CHGDIAL flag goes on, and "0" means that the CHGDIAL flag is "0", in other words, when in the manual mode, the dial 30 is assigned to shutter setting, and the dial 30 to aperture setting. After the display has been presented, return to the step S5 occurs.

Once again, when has arrived at the step S8, for now because the MFING flag is set, branch to the step S87 occurs and jump to the step S89 occurs before the timer counts 10 sec. out.

So long as the MF switch 87 (SWMF) is on, the timer continues being set at the step S98. Hence, the operation of the function set mode does not come to end.

When the MF switch 87 (SWMF) is turned on, branch to a step S100 occurs at the step S97.

(Step S100) Clear the SWMFF flag as the MFSW state flag.

Since, at this time, setting of the timer is not done, the program returns to the step S5 leaving the MF switch 87 (SWMF) in the OFF state. Then the loop: Step S5→Step S8→Step S87→Step S100→Step S5 starts and repeats itself. When 10 sec. has passed, the timer becomes "0". So branch from the step S87 to the step S88 occurs, and the MFING flag is cleared. Thus, the function set mode terminates. Then return to the main loop occurs.

Now, if the MF switch 87 (SWMF) is once again turned on at a time during the function set mode, branch to a step S98 occurs at the step S97.

(Step S98) Set the timer again to 10 sec.

(Step S99) Because the SWMFF flag is cleared in the step S100, for now, branch to a step S101 occurs.

(Step S101) Examine the value of the MF set register MFR Because of "1", the program advances to a step S102.

(Step S102) to (Step S104) are to invert the the CHGDIAL flag.

In such a manner, the camera can enter the function set mode, as it turns on by raising "1" at the SWMFF flag, and the flag can be inverted by once turning it off and turning it on again. Thus, the function of the CHGDIAL flag can be set.

If the dial 15 is rotated in the function set mode, the input port P47 becomes high, so that the program goes from the step S89 to a step S90.

(Step S90) Call the dial read subroutine.

(Step S91) Set 10 sec. in the timer. Therefore, each time the dial is rotated, the timer is prolonged.

(Step S92) Add the dial count register DIAL1R for the dial 15 to the MF set register MFR.

(Step S93) to (Step S96) are a routine for limiting the range for multi-function to between "1" and "2". By this, the functions in setting progress can be exchanged as "F−1"→"F−2" by counterclockwise rotation of the dial, or "F−2"→"F−1" by clockwise rotation. Incidentally, "1" represents that the exchanging of the TV and AV settings is in progress, and "2" represents that the setting of the exposure compensation is in progress.

In the case of the register MFR=2, that is, SW1DIAL flag, too, similarly to the case of the CHGDIAL flag, a step S105 to a step S107 are to change over the SW1DIAL when the MF switch 87 (SWMF) is pushed again, and its result is displayed by a step S113 to a step S116.

In such a manner, the function setting of the camera becomes possible.

As has been describe above, the use of either of the dial 15 of the camera body and the dial 30 additionally provided on the back cover makes it easier to set the manual mode and the exposure compensation. Further, even with the back cover having no dial, a slight modification of the management suffices for realizing the ability to input all the available functions.

Figure 15:
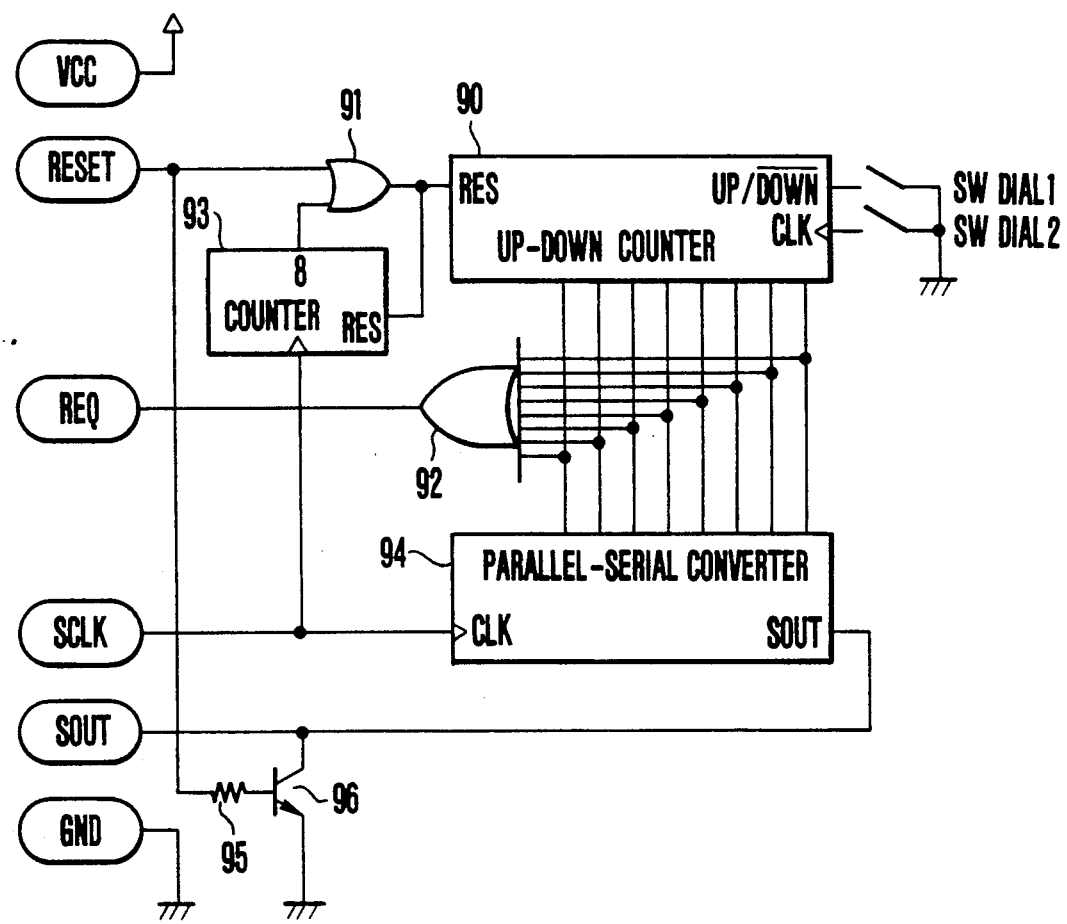
FIG. 15 illustrates the details of the dial circuit forming a second embodiment of the invention.

FIG. 15 shows a second embodiment of the dial circuit.

This embodiment is to perform discrimination of the dial circuit in a different way from that of the first embodiment (Detection is made by a method without communication). What is different from FIG. 9 is that a resistor 95 and a transistor 96 are added.

The operation of this embodiment is described.

When it detects that the back cover 20 has been closed, the CPU 50 produces high level at the output port P46 likewise as in the first embodiment. By this, the counters 90 and 93 are reset. Also, because this signal is applied through the resistor 95 to the base of the transistor 96, the transistor 96 becomes turned on, forcibly making the SOUT terminal to low level. In this state, the CPU 50 produces low level at the output port P45, enabling the AND gate 67. Thus, the dial circuit 56 of the back cover side is selected to operate. Then, the CPU 50 examines the input state of an SIN terminal. Since the SOUT terminal of the dial circuit 56 is low level, because the output of the AND gate 67 and the output of the OR gate 66 become low level, the SIN terminal of the CPU 50 gets low level. The CPU 50 read in the input of an SI terminal and, because it is low level, judges that the back cover with the dial circuit 56 is associated with the camera body.

In the case of the back cover without the dial circuit 56, the input terminal of the AND gate 67 is open. Therefore, it becomes high level, and the output also becomes high level, causing the OR gate 66 to produce an output of high level. The CPU 50 reads in the input of the SIN terminal, and, because the input is high level, the CPU 50 judges that the associated back cover has no dial circuit.

In this embodiment, it is also possible that similarly to the first embodiment, communication may be done so that the communication data are used for discriminating whether or not the back cover having the dial is associated with.

Next, a third embodiment is described with reference to FIG. 17 to FIGS. 20(a) and 20(b). The third embodiment is almost the same as the before-described first embodiment. So different parts only are described by using another reference characters.

Figure 17:
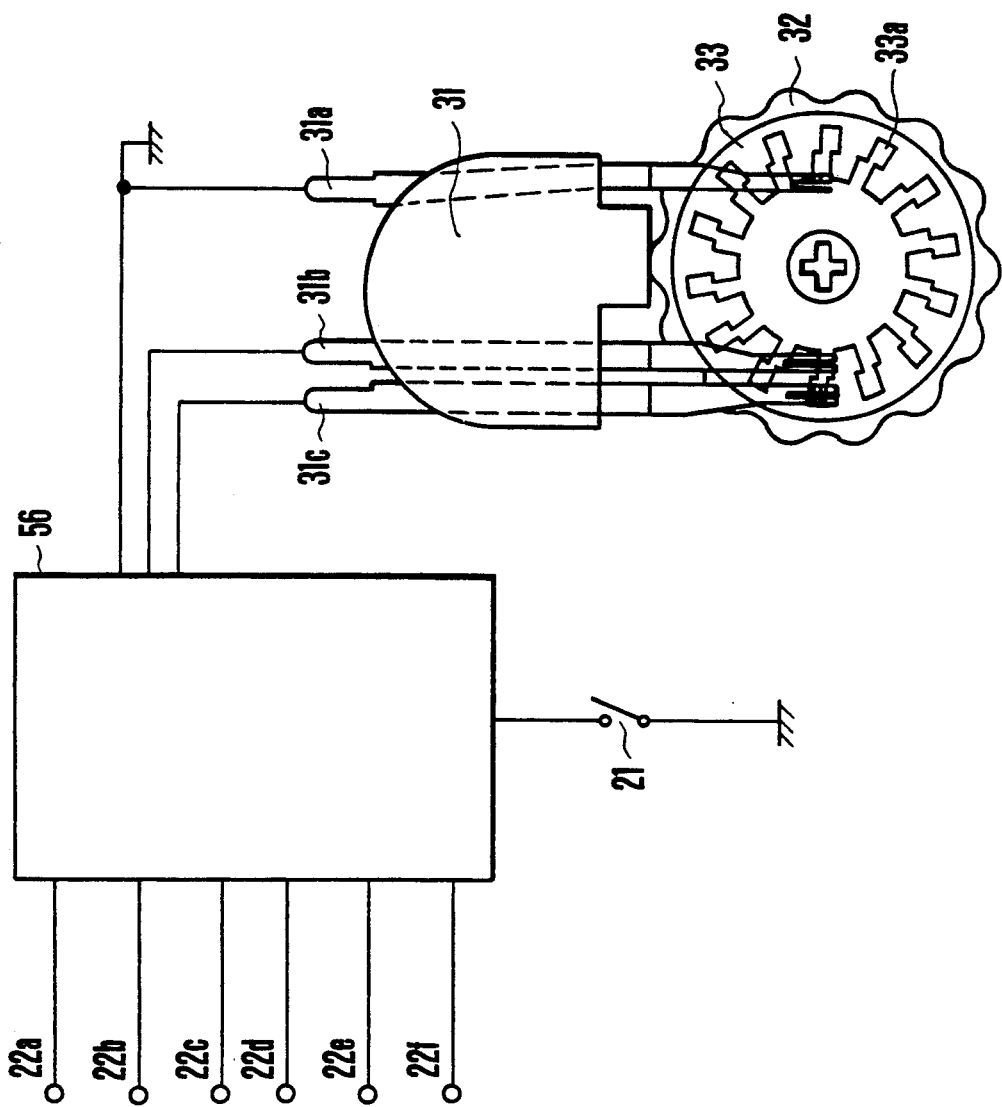
FIG. 17 illustrates the patterns of the dial forming a third embodiment of the invention.

In the dial portion of FIG. 17, a dial lock switch 21 is introduced into the dial circuit 56.

Figure 18:
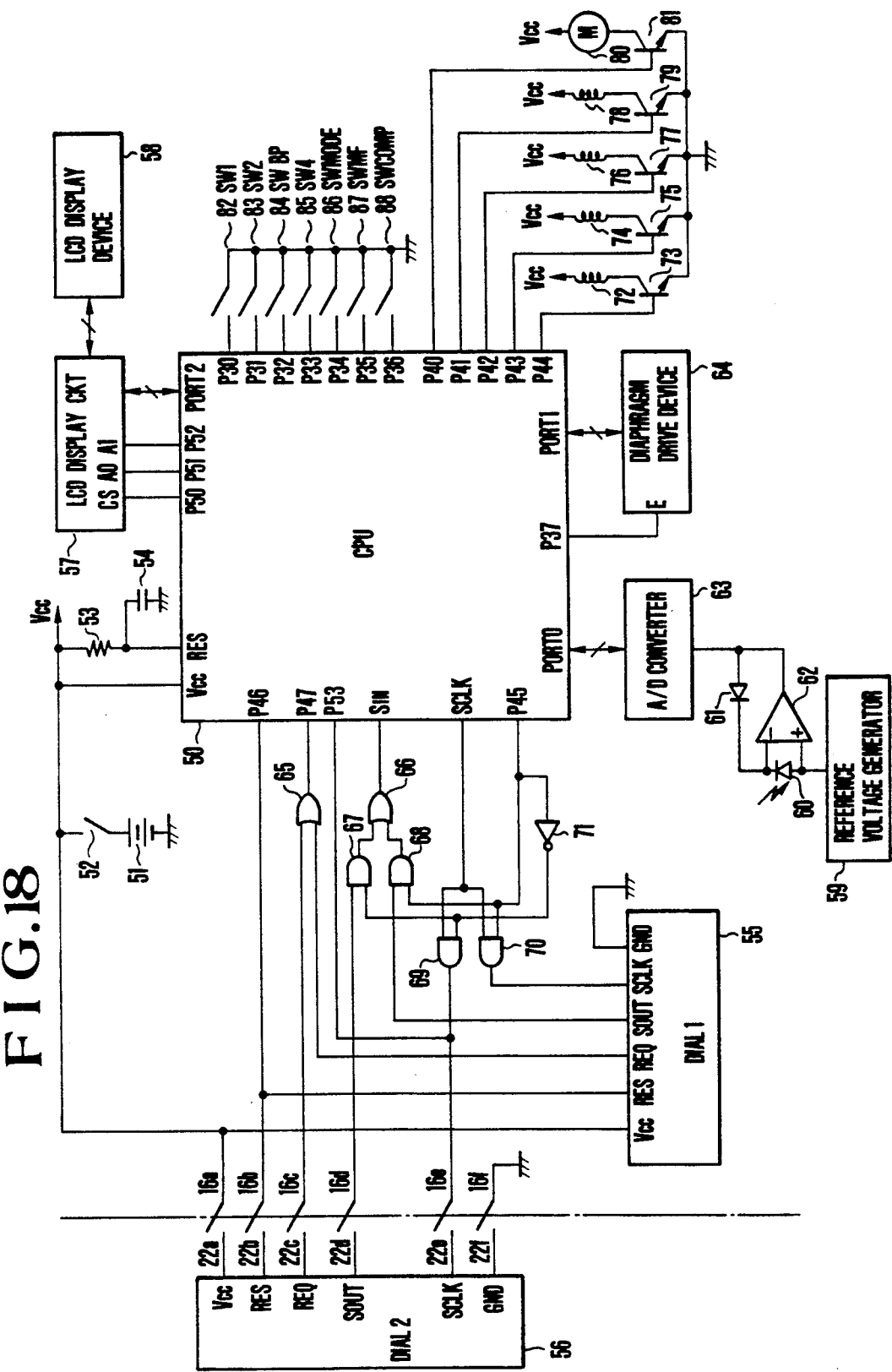
FIG. 18 is an electric circuit diagram of the entirety of the camera employing the third embodiment of the invention.

In the diagram of the entire circuitry of FIG. 18, P53 of the CPU 50 is an input port which is connected to the output of the AND gate 69.

Figure 19:
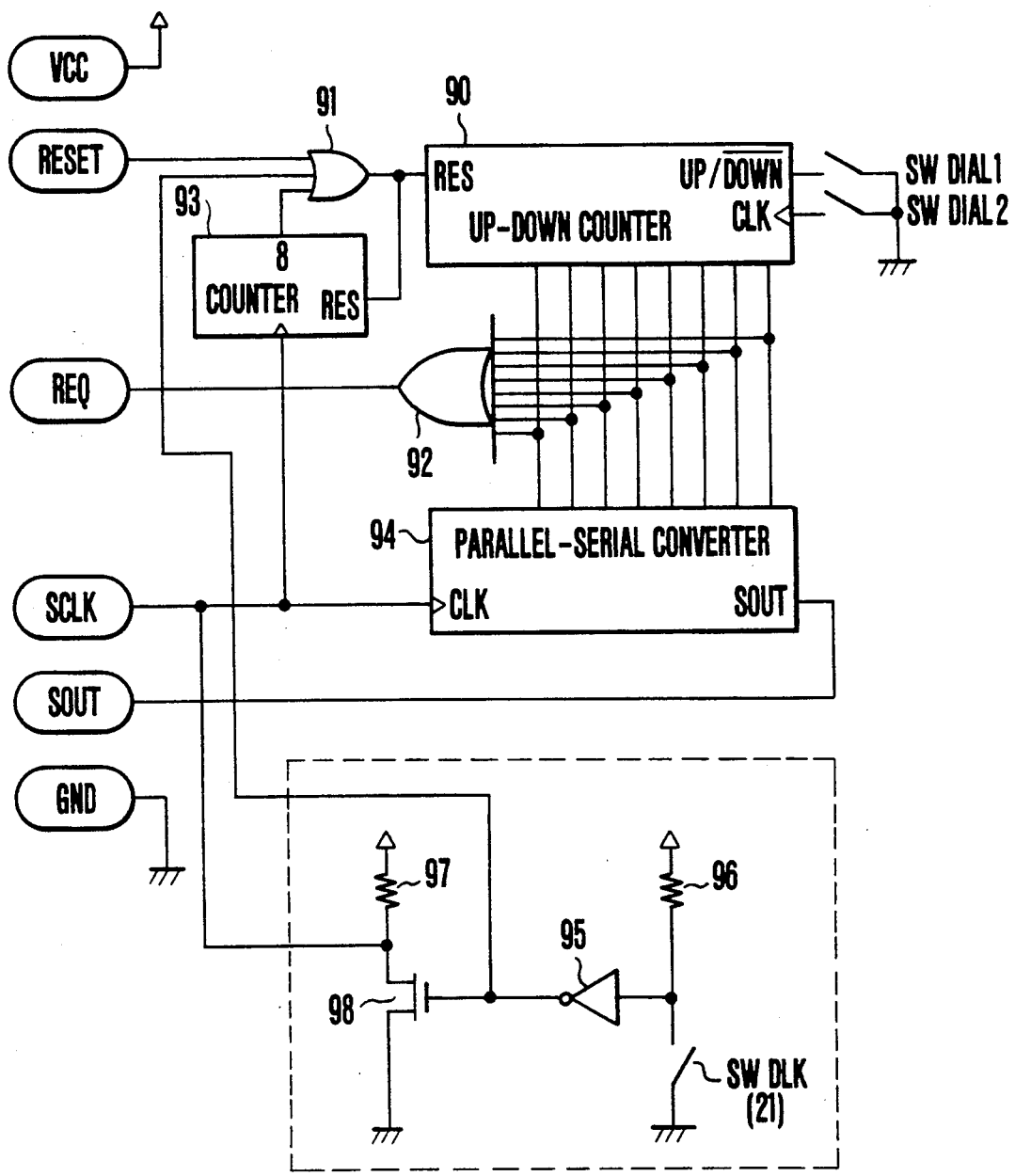
FIG. 19 illustrates the details of the dial circuit of FIG. 17.

In the dial circuit of FIG. 19, there are included an inverter gate 95, pull-up resistors 96 and 97, an N-channel MOS transistor 98, and a switch SWDLK which corresponds to the dial lock switch 21 shown in FIG. 17.

The dial lock (which means the input prohibition) switch SWDLK when in open state allows dial input. In this condition, the input of the inverter 95 is high. Therefore, its output becomes low. Though the output of the inverter 95 is connected to both the input of the OR gate 91 and the gate of the MOS transistor 98, this output of low state does not affect the output of the OR gate 91, and the transistor 98 also is left unchanged from the channel-off state. Hence, the dial circuit 56 operates in exactly the same manner as that in which the dial circuit 55 operates.

Meanwhile, when the dial lock switch SWDLK becomes an ON state, the dial circuit 56 prohibits dial input. Since, in this condition, the input of the inverter 95 is low, its output becomes high. For this reason, the OR gate 91 to which this high output is inputted changes its output to high level, thus resetting the up-down counter 90 and the counter 93. Meanwhile, because the MOS transistor 98 becomes a channel-on state, it makes low the SCLK signal line. Therefore, the dial circuit 50 no longer carries out the counting operation in response to rotation of the dial and also does not accept the serial communication by the CPU 50. The CPU 50 can detect whether or not the SCLK signal of the dial circuit 56 has become low level by reading the level of its own input port P53. Hence, the CPU 50, when the input level of the input port P53 is low, judges that the dial lock switch SWDLK is in the ON state.

It should be pointed out that at an event that the CPU 50 is to read the level of the input port P53, its own output ports P45 and, depending on the output state of the SCLK signal, also the output of the AND gate 69, are caused to change to low level. In order to correctly detect occurrence of the low level of the SCLK signal by the dial circuit 56, there is need to have a procedure that the SCLK signal of the CPU 50 is made high and the output of the output port P45 is made low before the input port P53 is read in.

Figure 20A:
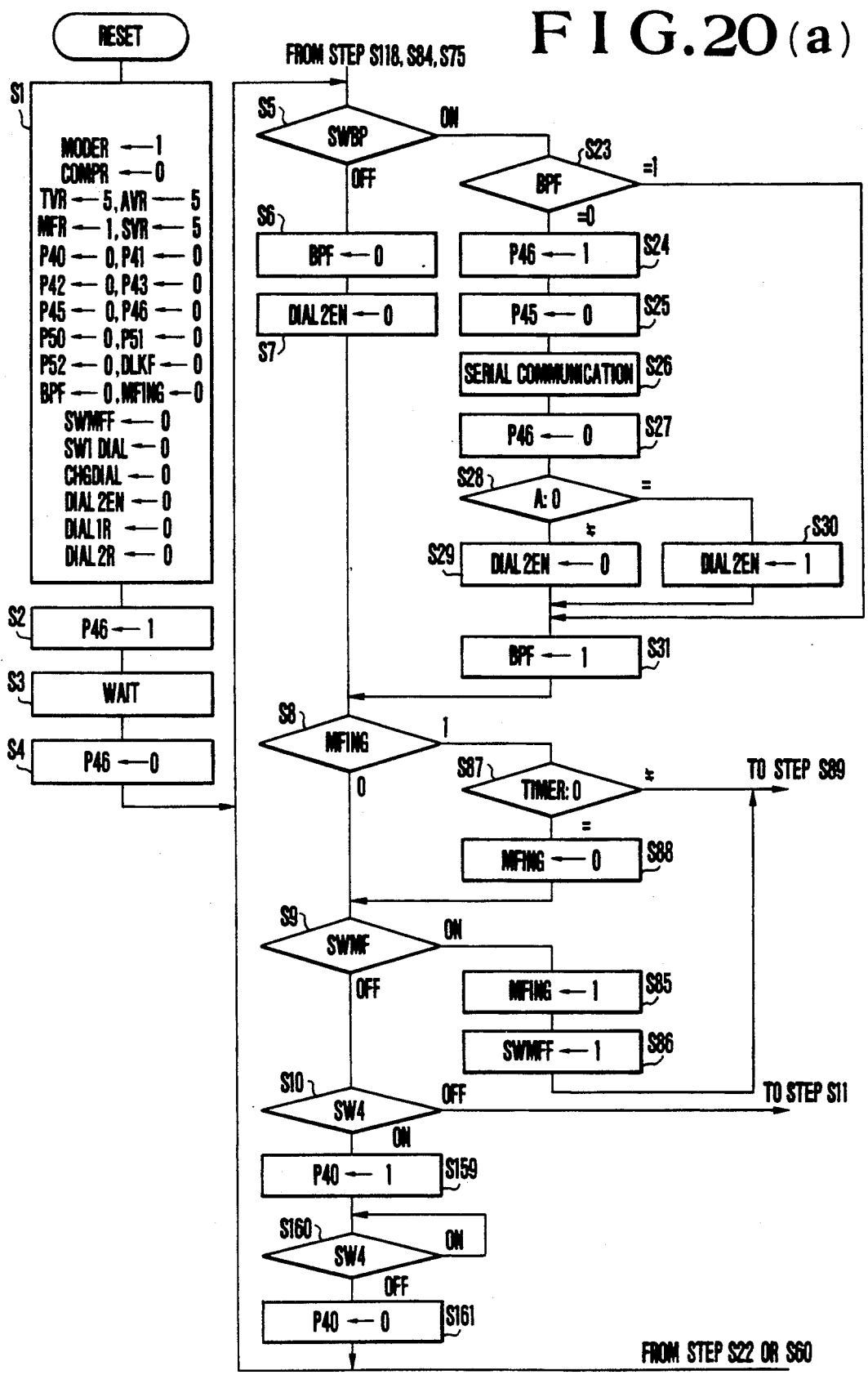

Next, the flowchart is explained by reference to FIGS. 20(a) and 20(b), where DLKF is a flag in the CPU 50. This flag is first cleared to "0" (Step S1).

In steps S45 and S46, if the dial lock switch 21 is in ON state, the value of the DIAL2R is always "0". Therefore, the dial 30 no longer is effective in altering the exposure compensation value. Therefore, the program advances to a step S200.

(Step S200) Read the input at the input port P53 to detect whether or not the dial lock switch 21 (SWDLK) of the dial circuit 56 is in the ON state. If not on, as it implies that the input of the dial circuit 56 is not prohibited, the program advances to a step S204.

(Step S204) Clear the flag DLKF representing that the ON state of the dial lock switch 21 (SWDLK) has once been detected.

Lastly, the operation with the dial lock switch 21 (SWDLK) when turned on is described. When this switch 21 (SWDLK) turns on, the SCLK signal of the dial circuit 56 becomes low. As this is detected in the step S200, the program advances to a step S201.

(Step S201) Examine the content of the flag DLKF for detecting the dial input prohibition. Here because the flag DLKF remains cleared in the step S1, the program advances to a step S202.

(Step S202) Clear the content of the register COMPR for exposure compensation. Therefore, the exposure compensation value becomes to "0" in response to input of the dial lock switch 21 (SWDLK).

(Step S203) Turn on the flag DLKF for detecting the dial input prohibition. The program then advances to a step S47.

Subsequently the program advances a step S47→a step S48→. . . With the aforesaid switch 21 (SWDLK) remaining turned on, when the advancing of the program arrives at the step S201 again, because, for now, the detection flag DLKF turns on in the step S203, the clearing of the register COMPR is not done. The program then advances to the step S47. In short, the clearing of the register COMPR resulting from the detection of the fact that the dial lock switch 21 (SWDLK) is on is permitted to take place only once at the time when the movement of that switch 21 (SWDLK) from the OFF to the ON State is detected. Thus it is made possible to set again an exposure compensation value by the exposure compensating operation of the step S47→the step S51. Also for the ON state of the aforesaid switch 21 (SWDLK), the dial circuit 56 lies in the reset state. Therefore, the value of the DIAL2R becomes always "0". Thus there is no possibility of occurrence of an erroneous setting of the exposure compensation value by the unintentional rotation of the dial 30.

It is to be noted that when the dial lock switch 21 (SWDLK) is turned off again, this is detected by the step S200. The program then advances to the step S204 to clear the detection flag DLKF. Therefore, it is needless to say that the dial 30 becomes possible again to use in setting the exposure compensation.

As has been described above, in the present embodiment, even the back cover side is provided with digital signal input means making it possible that during the time when shooting the camera, the photographer sets information into the camera while holding the camera as if his or her finger is about to push the release button. Further, this digital signal input means of the back cover side is so formed that a number of items of information can be selectively set in the camera. Hence, it is made possible to provide a camera which has greatly improved the manageability.

Also, the camera information that can be set by this digital signal input means of the back cover side is made to change over between two kinds automatically in response to selection of the times of supplying electric supply and of standby at which the setting is done. Thereby it is made possible to provide a camera whose manageability is improved despite the increased number of functions to be set, and in which erroneous information is prevented from being set in.

Also, in the camera of the present embodiment, the dial for inputting information into the camera is positioned on the flat surface of the back cover at such a location that not only for shots of the normal format, but also for vertical shots, inputting of information can be operated in a simple way and smoothly. In particular, thanks to the possibility of inputting information without having to remove the finger from the release button, it can be made sure not to miss good shutter chances. Also, detection of an actuation of the dial may be displayed in the form of sound. If so, occurrence of an accident of inputting undesired information can be warned, and, at the same time, correct inputs can be reaffirmed.

Also, in the present embodiment, the setting of the exposure compensation can be operated at the back cover. Even under the condition that the camera is being held with the finger rested on the release button, exposure compensation can be made. This has contributed to a great improvement of the manageability.

Also, the back cover is provided with an actuating member which can prohibit the exposure compensation. The use of this makes it possible to avoid unintentional exposure compensation. Further, by rendering this member operative, the exposure compensation information is set to the initial state. Therefore, even the accident that while overlooking the fact that the camera remains in the exposure compensation state as was used in the preceding shot, the photographer makes the next exposure, can be prevented from occurring.

Also, this actuating member can be used as a one-touch operated switch for clearing the exposure compensation. Therefore, there is produced even an advantage that shots positively using the exposure compensation factor becomes easier to take.

What is claimed is:

1. A camera comprising:
   first signal input means mounted in a camera body;
   second signal input means mounted in a back cover;
   a processing circuit receptive of signals from said first and second signal input means for processing camera information;
   a selecting circuit for selecting one of a plurity of exposure modes; and
   a changeover circuit for automatically changing over kinds of camera information which can be set by said second signal input means in accordance with a mode selected by said selecting circuit.

2. A camera according to claim 1, wherein said selecting circuit selects one of an automatic exposure mode and a manual exposure mode.

3. A camera according to claim 2, wherein said changeover circuit operates in such a manner that when said manual exposure mode is selected by said selecting circuit, said changeover circuit makes it possible to set an aperture value or a shutter time by said second signal input means; or
   when said automatic exposure mode is selected, said changeover circuit makes it possible to set camera information other than any of said aperture value and said shutter value by said second signal input means.

4. A camera according to claim 1, wherein said second signal input means includes an operating dial, and the inputting of digital signals into said processing circuit is performed by rotating said operating dial.

5. A camera comprising:
   signal input means mounted in a back cover;
   a processing circuit receptive of signals from said signal input means for processing camera information;
   a selecting circuit for selecting one of a plurality of exposure modes; and
   a changeover circuit for automatically changing over kinds of camera information which can be set by said signal input means in accordance with a mode selected by said selecting circuit.

6. A camera according to claim 5, wherein said selecting circuit selects one of an automatic exposure mode and a manual exposure mode.

7. A camera according to claim 6, wherein said changeover circuit operates in such a manner that when said manual exposure mode is selected by said selecting circuit, said changeover circuit makes it possible to set an aperture value or a shutter time by said signal input means, or
   when said automatic exposure mode is selected, said changeover circuit makes it possible to set camera information other than any of said aperture value and said shutter time by said signal input means.

8. A camera according to claim 5, wherein said signal input means includes an operating dial, and the inputting of digital signals into said processing circuit is performed by rotating said operating dial.

9. A camera comprising:
   first manual signal input means for inputting information mounted in a camera body;
   second manual signal input means for inputting information mounted in a back cover;
   a processing circuit receptive of signals from said first and second signal input means for processing camera information; and
   a changeover circuit for replacing a first camera information which can be set by said first signal input means and a second camera information which can be set by said second signal input means, whereby the second camera information can be set by said first signal input means and the first camera information can be set by said second signal input means.

10. A camera according to claim 9, wherein said changeover circuit replaces an aperture value with a shutter time with each other.

11. A camera according to claim 9, wherein said second signal input means includes an operating dial, and the inputting of digital signals into said processing circuit is performed by rotating said operating dial.

12. A camera comprising:
    signal input means mounted in a back cover;
    a processing circuit receptive of signals from said signal input means for processing camera information; and
    a changeover circuit for automatically changing over kinds of camera information which can be set by said signal input means according to whether electric power is being supplied by operating a release button or said camera in on standby without operating the release button.

13. A camera according to claim 12, wherein camera information which can be set by said signal input means when electric power is supplied by exposure compensation information.

14. A camera according to claim 13, wherein camera information which can be set by said signal input means when said camera is on standby is an aperture value or a shutter time.

15. A camera according to claim 12, wherein said signal input means includes an operating dial, and the inputting of digital signals into said processing circuit is performed by rotating said operating dial.

16. A camera comprising:
    signal input means for inputting information mounted in a back cover;
    an exposure compensating circuit receptive of signals from said signal input means for changing an exposure value information from an initial exposure state to an exposure compensating state;
    prohibiting means for prohibiting exposure compensation in said exposure compensating circuit; and
    a setting circuit responsive to prohibition control of said prohibiting means for setting an exposure value information of said exposure compensating circuit to an initial exposure state.

17. A camera according to claim 16, wherein said signal input means includes an operating dial and the inputting of a digital signal into said exposure compensating circuit is performed by rotating said operating dial.

18. A camera according to claim 16, wherein said prohibiting means performs prohibition control by an operation of an operating member mounted in said back cover.

19. A camera according to claim 17, wherein said operating dial is arranged in a position close to the thumb in the state of holding a camera body.

20. A camera according to claim 19, wherein an operating member is arranged close to said operating dial and the prohibition control of said prohibiting means is performed by operating said operating member.

21. A camera comprising:
first signal input means having a first manual operation member arranged near a release button;
second signal input means having a second manual operation member arranged on a back side of the camera, said second manual operation member being in the form of a rotatable operation dial;
a processing circuit receptive of signals from said first and second signal input means for processing camera information;
a selecting circuit for selecting one of the modes relevant to an exposure; and
a changeover circuit for changing over kinds of camera information which can be set by said second signal input means in accordance with a mode selected by said selecting circuit.

22. A camera according to claim 21, wherein said selecting circuit selects one of an automatic exposure mode and a manual exposure mode.

23. A camera according to claim 22, wherein said changeover circuit operates in such a manner that when said manual exposure mode is selected by said selecting circuit, said changeover circuit makes it possible to set an aperture value or a shutter time by said second signal input means; or when said automatic exposure mode is selected, said changeover circuit makes it possible to set camera information other than any of said aperture value and said shutter value by said second signal input means.

24. A camera according to claim 21, wherein the inputting of digital signals into said processing circuit is performed by rotating said second manual operation member.

25. A camera comprising:
signal input means having a manual operation member arranged on a back side of the camera, said manual operation member being in the form of a rotatable operation dial;
a processing circuit receptive of signals from said signal input means for processing camera information;
a selecting circuit for selecting one of the modes relevant to exposure, wherein said selecting circuit selects one of an automatic exposure mode and a manual exposure mode; and
a changeover circuit for changing over kinds of camera information which can be set by said signal input means in accordance with a mode selected by said selecting circuit.

26. A camera according to claim 25, wherein said changeover circuit operates in such a manner when said manual exposure mode is selected by said selecting circuit, said changeover circuit makes it possible to set an aperture value or a shutter time by said signal input means, or when said automatic exposure mode is selected, said changeover circuit makes it possible to set camera information other than any of said aperture value and said shutter time by said signal input means.

27. A camera according to claim 25, wherein inputting of digital signals into said processing circuit is performed by rotating said manual operation member.

28. A camera comprising:
first manual signal input means for inputting information mounted proximate to a release button;
second manual signal input means for inputting information mounted in a back face of the camera, said second manual signal input means comprises a rotatable operation dial;
a processing circuit receptive of signals from said first and second manual signal input means for processing camera information; and
a changeover circuit for replacing a first camera information which can be set by said first manual signal input means and a second camera information which can be set by said second manual signal input means, whereby the second camera information can be set by said first manual signal input means and the first camera information can be set by said second manual signal input means.

29. A camera according to claim 28, wherein said changeover circuit replaces an aperture value and a shutter time with each other.

30. A camera according to claim 28, wherein the inputting of digital signals into said processing circuit is performed by rotating said rotatable operation dial.

31. A camera comprising:
signal input means having a manual operation member arranged on a back side of the camera, said manual operation member being in a form of a rotatable operation dial;
an exposure compensating circuit receptive of signals from said signal input means for changing an exposure value information from an initial exposure state to an exposure compensating state;
prohibiting means for prohibiting exposure compensation in said exposure compensating circuit; and
a setting circuit responsive to prohibition control of said prohibiting means for setting an exposure value information of said exposure compensating circuit to an initial exposure state.

32. A camera according to claim 31, wherein the inputting of a digital signal into said exposure compensating circuit is performed by rotating said manual operation member.

33. A camera according to claim 31, wherein said prohibiting means performs prohibition control by an operation of an operating member arranged in said back face of the camera.

34. A camera according to claim 32, wherein said manual operation member is arranged in a position proximate to the operator's thumb in the state of holding the camera.

35. A camera according to claim 34, wherein a second manual operation member is arranged proximate to said manual operation member and the prohibition control of said prohibiting means is performed by operating said manual operation member.

36. A camera comprising:
first signal input means having a first manual operation member arranged near a release button, second signal input means having a second manual operation member arranged on a back side of the camera, said second manual operation member being in a form of a rotatable operation dial;

a processing circuit receptive of signals from said first and second signal input means for processing camera information;

a selecting circuit for selecting one of the modes relevant to exposure; and control means which permits continuous change of a first exposure value by said first signal input means in response to a mode selection by said selecting circuit and prohibits change of a second exposure value by said second signal means.

37. A camera according to claim 36, wherein said first exposure value is one of a shutter time and an aperture value said second exposure value is the other of said shutter time and said aperture value.

38. A camera according to claim 36, further comprising:

display means for displaying said first exposure value and said second exposure value said display means stopping display of said second exposure value in response to said mode selected by said selecting circuit.

39. A camera comprising:

first signal input means having a first manual operation member arranged near a release button;

second signal input means having a second manual operation member, said second manual operation member being located at a distance from said release button greater than said first manual operation member;

a processing circuit receptive of signals from said first and second signal input means for processing camera information; and a changeover circuit for replacing a first camera information which can be set by said first signal input means and a second camera information which can be set by said second signal input means, whereby the second camera information can be set by said first signal input means and the first camera information can be set by said second signal input means.

40. A camera according to claim 39, wherein said changeover circuit operates in such a manner that when a manual exposure mode is selected by a selecting circuit, said changeover circuit makes it possible to set either an aperture value or a shutter time by said second signal input means; or when an automatic exposure mode is selected, said changeover circuit makes it possible to set camera information other than said aperture value and said shutter value by said second signal input means.

41. A camera according to claim 39, wherein the inputting of digital signals into said processing circuit is performed by rotating said first manual operation member.

42. A camera according to claim 39, wherein the inputting of digital signals into said processing circuit is performed by rotating said second manual operation member.

43. A camera according to claim 41, wherein the inputting of digital signals into said processing circuit is performed by rotating said second manual operation member.

* * * * *

UNITED STATES PATENT AND TRADEMARK OFFICE
CERTIFICATE OF CORRECTION

PATENT NO. : 5,291,236
DATED : March 1, 1994
INVENTOR(S) : TOSHIFUMI OHSAWA, ET AL.

It is certified that error appears in the above-indentified patent and that said Letters Patent is hereby corrected as shown below:

COLUMN 4
    Line 60, "clockwise, as" should read --clockwise, the signals at the inputs change in such a sequence that, as--.

COLUMN 5
    Line 12, "unit" should be deleted.
    Line 13, "count, one" should read --count one unit--.

COLUMN 7
    Line 34, "assembled with." should read --assembled--.
    Line 46, "(step S31)" should read --(Step S31)--.

COLUMN 8
    Line 47, "5.2" should read --5+2--.

COLUMN 10
    Line 65, "(step S82)" should read -- (Step S82)--.

COLUMN 13
    Line 14, "when has" should read --when the flow has--.
    Line 41, "MFR" should read --MFR.--

COLUMN 14
    Line 7, "describe" should read --described--.
    Line 52, "with" should read --therewith--.
    Line 57, "another" should read --other--.

UNITED STATES PATENT AND TRADEMARK OFFICE
CERTIFICATE OF CORRECTION

PATENT NO. : 5,291,236
DATED : March 1, 1994
INVENTOR(S) : TOSHIFUMI OHSAWA, ET AL.

Page 2 of 2

It is certified that error appears in the above-indentified patent and that said Letters Patent is hereby corrected as shown below:

COLUMN 15
Line 67, "becomes to" should read --becomes--.

COLUMN 16
Line 15, "State" should read --state--.

COLUMN 17
Line 11, "makes" should read --making--.
Line 17, "becomes" should read --become--.
Line 25, "plurity" should read --plurality--.

COLUMN 18
Line 26, "with" should read --and--.
Line 45, "by" should read --is--.

COLUMN 19
Line 66, "manner" should read --manner that--.

COLUMN 21
Line 16, "value said" should read --value, and said--.

Signed and Sealed this

Twenty-second Day of November, 1994

Attest:

BRUCE LEHMAN

*Attesting Officer*  *Commissioner of Patents and Trademarks*